United States Patent
Barbosa et al.

(10) Patent No.: US 12,551,130 B2
(45) Date of Patent: Feb. 17, 2026

(54) METHODS OF TARGETING NEURAL CIRCUIT FOR PERSONALIZED NEUROMODULATION FOR IMPULSIVITY-RELATED OR UNCONTROLLABLE BEHAVIORS

(71) Applicant: The Board of Trustees of the Leland Stanford Junior University, Stanford, CA (US)

(72) Inventors: Daniel Alves Neiva Barbosa, San Jose, CA (US); Casey Halpern, Philadelphia, PA (US); Jennifer Mcnab, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 18/569,984

(22) PCT Filed: Jun. 13, 2022

(86) PCT No.: PCT/US2022/033274
§ 371 (c)(1),
(2) Date: Dec. 13, 2023

(87) PCT Pub. No.: WO2022/266000
PCT Pub. Date: Dec. 22, 2022

(65) Prior Publication Data
US 2024/0277247 A1    Aug. 22, 2024

Related U.S. Application Data

(60) Provisional application No. 63/210,472, filed on Jun. 14, 2021.

(51) Int. Cl.
A61B 5/00    (2006.01)
A61B 5/055   (2006.01)
G16H 20/30   (2018.01)

(52) U.S. Cl.
CPC ............ *A61B 5/055* (2013.01); *A61B 5/0036* (2018.08); *A61B 5/0042* (2013.01); *G16H 20/30* (2018.01); *A61B 2576/026* (2013.01)

(58) Field of Classification Search
CPC ..................................................... A61B 5/055
See application file for complete search history.

(56) References Cited

U.S. PATENT DOCUMENTS

2012/0226138 A1   9/2012   Desalles et al.
2013/0267825 A1   10/2013  Wohlgemuth
(Continued)

OTHER PUBLICATIONS

Andersson et al. (Oct. 2003) "How to Correct Susceptibility Distortions in Spin-echo Echo-planar Images Application to Diffusion Tensor Imaging", NeuroImage, 20(2):870-888.
(Continued)

*Primary Examiner* — Joseph M Santos Rodriguez
(74) *Attorney, Agent, or Firm* — Mintz Levin Cohn Ferris Glovsky and Popeo, P.C.

(57) ABSTRACT

Provided herein is a method of targeting a neural circuit of a subject having an impulsivity-related or uncontrollable behavior, the method comprising (a) generating a circuit specific brain connectivity profile using a directionality map of water diffusivity based on MRI of the subject; (b) generating a circuit-specific voxel-wise connectivity matrix with the circuit specific brain connectivity profile to define a region of interest comprising the neural circuit to be targeted; (c) using an algorithm to segment the circuit-specific voxel-wise connectivity matrix to generate a 3D sub-region to identify the neural circuit to be targeted; and
(Continued)

(d) targeting the identified neural circuit with a neuromodulation therapy.

13 Claims, 13 Drawing Sheets

(56) References Cited

U.S. PATENT DOCUMENTS

| | | |
|---|---|---|
| 2014/0294270 A1 | 10/2014 | Schneider et al. |
| 2015/0073258 A1 | 3/2015 | Mazer et al. |
| 2017/0052241 A1 | 2/2017 | Cetingul et al. |
| 2020/0323479 A1 | 10/2020 | Romano et al. |
| 2021/0082113 A1 | 3/2021 | Jara et al. |

OTHER PUBLICATIONS

Avants et al. (Feb. 1, 2011) "A Reproducible Evaluation of ANTs Similarity Metric Performance in Brain Image Registration", Neuroimage, 54(3): 2033-2044.

Avants et al. (Dec. 2011) "An Open Source Multivariate Framework for n-Tissue Segmentation with Evaluation on Public Data", Neuroinformatics, 9(4):381-400.

Baliki et al. (Oct. 9, 2013) "Parceling Human Accumbens into Putative Core and Shell Dissociates Encoding of Values for Reward and Pain", The Journal of Neuroscience, 33(41):16383-16393.

Beck et al. (1988) "An Inventory for Measuring Clinical Anxiety: Psychometric Properties", Journal of Consulting and Clinical Psychology, 56(6):893-897.

Beck et al. (1961) "An Inventory for Measuring Depression", Archives of General Psychiatry, 4:561-571.

Behrens et al. (Jan. 1, 2007) "Probabilistic Diffusion Tractography with Multiple Fibre Orientations: What Can We Gain?", Neuroimage, 34(1):144-155.

Blomquist et al. (Mar. 2014) "Development and Validation of the Eating Loss of Control Scale", Psychological assessment, 26(1):77-89.

Bossert et al. (Apr. 4, 2012) "Role of Projections from Ventral Medial Prefrontal Cortex to Nucleus Accumbens Shell in Context-Induced Reinstatement of Heroin Seeking", The Journal of Neuroscience, 32(14):4982-4991.

Cartmell et al. (Sep. 2019) "Multimodal Characterization of the Human Nucleus Accumbens", Neuroimage, 198:137-149.

Chao et al. (Nov. 2016) "Binge-Eating Disorder and the Outcome of Bariatric Surgery in a Prospective, Observational Study: Two-Year Results", Obesity, 24(11):2327-2333.

Cho et al. (Dec. 2019) "Resting-State Functional Connectivity Modulates the BOLD Activation Induced by Nucleus Accumbens Stimulation in the Swine Brain", Brain and behavior, 9:e01431.

Ciric et al. ( Jul. 1, 2017) "Benchmarking of Participant-Level Confound Regression Strategies for The Control of Motion Artifact in Studies of Functional Connectivity", Neuroimage, 154:174-187.

Davis et al. (Jun. 2009) "Assessing the Effects of Age on Long White Matter Tracts Using Diffusion Tensor Tractography", Neuroimage, 46(2): 530-541.

Donnelly et al. (Dec. 2018) "Neuroimaging in Bulimia Nervosa and Binge Eating Disorder: A Systematic Review", Journal of Eating Disorders, 6:3.

Dunlop et al. (Jun. 1, 2017) "Functional Connectivity of the Subcallosal Cingulate Cortex And Differential Outcomes to Treatment With Cognitive-Behavioral Therapy or Antidepressant Medication for Major Depressive Disorder", American Journal of Psychiatry, 174(6):533-545.

Essen et al. (Oct. 2012) "The Human Connectome Project: a data acquisition perspective", Neuroimage, 62(4):2222-2231.

Esteban et al. (Jan. 2019) "Fmriprep: A Robust Preprocessing Pipeline for Functional MRI", Nature methods, 16(1):111-116.

Geha et al. (Mar. 2017) "Reorganization of Brain Connectivity in Obesity", Human Brain Mapping, 38:1403-1420.

Ghazizadeh et al. (Jan. 11, 2012) "Prefrontal Cortex Mediates Extinction of Responding by Two Distinct Neural Mechanisms in Accumbens Shell", The Journal of Neuroscience, 32(2):726-737.

Glasser et al. (Oct. 15, 2013) "The Minimal Preprocessing Pipelines for the Human Connectome Project", Neuroimage, 80:105-124.

Gratz et al. (Mar. 2004) "Multidimensional Assessment of Emotion Regulation and Dysregulation: Development, Factor Structure, and Initial Validation of the Difficulties in Emotion Regulation Scale", Journal of Psychopathology and Behavioral Assessment, 26:41-54.

Grucza et al. (Mar. 2007) "Prevalence and Correlates of Binge Eating Disorder in a Community Sample", Comprehensive psychiatry, 48(2):124-131.

Haber et al. (Aug. 9, 2006) "Reward-Related Cortical Inputs Define a Large Striatal Region in Primates That Interface with Associative Cortical Connections, Providing a Substrate for Incentive-Based Learning", The Journal of Neuroscience, 26(32):8368-8376.

Halpern et al. (Apr. 24, 2013) "Amelioration of Binge Eating by Nucleus Accumbens Shell Deep Brain Stimulation in Mice Involves D2 Receptor Modulation", The Journal of Neuroscience, 33(17):7122-7129.

He et al. (Jun. 2016) "Altered White Matter Microstructure in Adolescents and Adults with Bulimia Nervosa", Neuropsychopharmacology, 41(7):1841-1848.

Ho et al. (Mar. 25, 2015) "Deep Brain Stimulation for Obesity", Cureus, 7(3): e259.

Honey et al. (Feb. 10, 2009) "Predicting Human Resting-State Functional Connectivity from Structural Connectivity", Proceedings of the National Academy of Sciences, 106(6):2035-2040.

Jenkinson et al. (Aug. 15, 2012) "FSL", NeuroImage, 62(2):782-790.

Kessler et al. (May 1, 2013) "The Prevalence and Correlates of Binge Eating Disorder in the WHO World Mental Health Surveys", Biological psychiatry, 73(9):904-914.

Lavagnino et al. (Aug. 2016) "Reduced Inhibitory Control Mediates the Relationship Between Cortical Thickness in the Right Superior Frontal Gyrus and Body Mass Index", Neuropsychopharmacology, 41(9):2275-2282.

Marsh et al. (Apr. 1, 2015) "Anatomical Characteristics of the Cerebral Surface in Bulimia Nervosa", Biological psychiatry, 77(7): 616-623.

Mccuen-Wurst et al. (Jan. 2018) "Disordered Eating and Obesity: Associations Between Binge Eating-Disorder, Night-Eating Syndrome, and Weight-Related Co-Morbidities", Annals of the New York Academy of Sciences, 1411(1):96-105.

Medic et al. (Jul. 2016) "Increased Body Mass index Is Associated with Specific Regional Alterations in Brain Structure", International Journal of Obesity, 40(7):1177-1182.

Nauczyciel et al. (Dec. 2013) "The Nucleus Accumbens: A Target for Deep Brain Stimulation In Resistant Major Depressive Disorder", Journal of Molecular Psychiatry, 1:17.

Parkes et al. (May 1, 2018) "An Evaluation of The Efficacy, Reliability, and Sensitivity of Motion Correction Strategies for Resting-State Functional MRI", NeuroImage, 171:415-436.

Pauli et al. (Apr. 17, 2018) "A High-Resolution Probabilistic in Vivo Atlas of Human Subcortical Brain Nuclei", Scientific data, 5:180063.

Pierce et al. (Oct. 2013) "Deep Brain Stimulation for the Treatment of Addiction: Basic and Clinical Studies and Potential Mechanisms of Action", Psychopharmacology, 229(3): 487-491.

Power et al. (Jan. 2014) "Methods to Detect, Characterize, and Remove Motion Artifact in Resting State Fmri", Neuroimage, 84:320-341.

Power et al. (Feb. 1, 2012) "Spurious but Systematic Correlations in Functional Connectivity MRI Networks Arise from Subject Motion", Neuroimage, 59(3): 2142-2154.

Rapuano et al. (Oct. 27, 2020) "Nucleus Accumbens Cytoarchitecture Predicts Weight Gain in Children", Proceedings of the National Academy of Sciences, 117(43):26977-26984.

Richard et al. (Feb. 15, 2013) "Prefrontal Cortex Modulates Desire and Dread Generated by Nucleus Accumbens Glutamate Disruption", Biological psychiatry, 73(4):360-370.

(56) References Cited

OTHER PUBLICATIONS

Riva-Posse et al. (Apr. 2018) "A connectomic approach for subcallosal cingulate deep brain stimulation surgery: prospective targeting in treatment-resistant depression", Molecular psychiatry, 23(4):843-849.
Salat et al. (Jul. 2004) "Thinning of the Cerebral Cortex in Aging", Cerebral Cortex, 14:721-730.
Smith et al. (2004) "Advances in Functional and Structural MR Image Analysis and Implementation as FSL", Neuroimage, 23(Suppl 1):S208-S219.
Sotiropoulos et al. (Oct. 15, 2013) "Advances in Diffusion MRI Acquisition and Processing in the Human Connectome Project", Neuroimage, 80:125-143.
Stice et al. (Nov. 2013) "The Contribution Of Brain Reward Circuits To The Obesity Epidemic.", Neuroscience & Biobehavioral Reviews, 37(9 Pt A):2047-2058.
Tronnier et al. (Feb. 2018) "Massive Weight Loss Following Deep Brain Stimulation Of The Nucleus Accumbens In A Depressed Woman.", Neurocase, 24(1):49-53.
Tschentscher et al. (Feb. 2019) "Reduced Structural Connectivity Between Left Auditory Thalamus and the Motion-Sensitive Planum Temporale in Developmental Dyslexia", The Journal of Neuroscience, 39(9):1720-1732.
Tustison et al. (Jun. 2010) "N4ITK: Improved N3 Bias Correction.", IEEE Trans Med Imaging, 29(6):1310-1320.
Yan et al. (2016) "DPABI: Data Processing & Analysis for (Resting-State) Brain Imaging", Neuroinformatics, 14:339-351.
Vassoler et al. (Sep. 2013) "Deep Brain Stimulation of the Nucleus Accumbens Shell Attenuates Cocaine Reinstatement through Local and Antidromic Activation", The Journal of Neuroscience, 33(36):14446-14454.
Volkow et al. (Jan. 2009) "Inverse Association Between BMI and Prefrontal Metabolic Activity in Healthy Adults", Obesity (Silver Spring), 17(1):60-65.
Watson et al. (1988) "Development and Validation of Brief Measures of Positive and Negative Affect: The PANAS Scales", Journal of Personality and Social Psychology, 54(6):1063-1070.
White et al. (Feb. 2010) "Loss of Control over Eating Predicts Outcomes in Bariatric Surgery: A Prospective 24-Month Follow-up Study", The Journal of Clinical Psychiatry, 71(2):175-184.
Winecoff et al. (Jul. 2013) "Ventromedial Prefrontal Cortex Encodes Emotional Value", Journal of Neuroscience, 33(27):11032-11039.
Wu et al. (Nov. 2020) "Brain-Responsive Neurostimulation for Loss of Control Eating: Early Feasibility Study", Neurosurgery, 87(6):1277-1288.
Wu et al. (2018) "Closing The Loop On Impulsivity Via Nucleus Accumbens Delta-band Activity In Mice And Man", Proceedings of the National Academy of Sciences of the United States of America, 115(1):192-197.
Kakusa et al. (Mar. 4, 2019) "Robust Clinical Benefit of Multi-Target Deep Brain Stimulation for Treatment of Gilles De La Tourette Syndrome and its Comorbidities", Brain Stimulation, 12(3):816-818.
Kakusa et al. (Jan. 2021) "Evidence for the Role of the Dorsal Ventral Lateral Posterior Thalamic Nucleus Connectivity in Deep Brain Stimulation for Gilles De La Tourette Syndrome", Journal of Psychiatric Research, 132:60-64.
Lavagnino et al. (Sep. 2016) "Inhibitory Control in Obesity and Binge Eating Disorder: A Systematic Review and Meta-Analysis of Neurocognitive and Neuroimaging Studies", Neuroscience & Biobehavioral Reviews, 68:714-716.
Mantione et al. (Jan. 2010) "Smoking Cessation and Weight Loss After Chronic Deep Brain Stimulation of the Nucleus Accumbens Therapeutic and Research Implications: Case Report", Neurosurgery, 66(1):E218.
Prium et al. (May 15, 2015) "ICA-AROMA: A Robust ICA-Based Strategy for Removing Motion Artifacts from FMRI Data", NeuroImage, 112:267-277.
Royston, Patrick (Sep. 1992) "Approximating the Shapiro-Wilk W-Test for Non-Normality", Statistics and Computing, 2:117-119.
International Search Report and Written Opinion Issued in Application No. PCT/US2022/033274 mailed on Oct. 11, 2022, 16 Pages.

METHODS OF TARGETING NEURAL CIRCUIT FOR PERSONALIZED NEUROMODULATION FOR IMPULSIVITY-RELATED OR UNCONTROLLABLE BEHAVIORS

RELATED APPLICATION

This application is a national stage application under 35 U.S.C. § 371, based on International Patent Application No. PCT/US2022/033274, filed on Jun. 13, 2022, which claims priority to U.S. Provisional Patent Application Ser. No. 63/210,472, filed Jun. 14, 2021, the disclosures of which are incorporated herein by reference in their entireties, including any drawings.

BACKGROUND

The coexistence of obesity and binge eating, a behavior marked by pathological impulsivity and uncontrollable behavior, is a strong predictor of treatment-refractoriness, leading to worse outcomes even to the most aggressive treatments (McCuen-Wurst et al., 2018; White et al., 2010). Unraveling the neural correlates of this common comorbidity could provide unique insights into mechanisms of treatment-refractoriness and guide development of neuromodulatory therapies.

The ventromedial prefrontal cortex (vmPFC) to nucleus accumbens (NAc) circuit has been implicated in inhibitory control. Impaired inhibitory control implicated in obesity often manifests as binge eating, which is associated with higher rates of metabolic and psychiatric disorders and worse treatment outcomes. It remains unclear whether there is an aberration in this inhibitory control circuit in binge-prone subjects with obesity.

The present disclosure may not only shed light on the neural correlates of comorbid binge eating and obesity, but also inform and address a pressing need for the development of circuit-based treatments for this major unmet need.

SUMMARY

Provided herein is a method of targeting a neural circuit of a subject having an impulsivity-related or uncontrollable behavior, the method comprising (a) generating a circuit-specific brain connectivity profile using a directionality map of water diffusivity based on MRI of the subject; (b) generating a circuit-specific voxel-wise connectivity matrix with the circuit-specific brain connectivity profile to define a region of interest comprising the neural circuit to be targeted; (c) using an algorithm to segment the circuit-specific voxel-wise connectivity matrix to generate a 3D sub-region to identify the neural circuit to be targeted; and (d) targeting the identified neural circuit with a neuromodulation therapy.

Provided herein is a method of treating a subject having an impulsivity-related or uncontrollable behavior, the method comprising (a) generating a circuit-specific brain connectivity profile using a directionality map of water diffusivity based on MRI of the subject; (b) generating a circuit-specific voxel-wise connectivity matrix with the circuit-specific brain connectivity profile to define a region of interest comprising the neural circuit to be targeted; (c) using an algorithm to segment the circuit-specific voxel-wise connectivity matrix to generate a 3D sub-region to identify the neural circuit to be targeted; and (d) treating the subject with a neuromodulation therapy by targeting the identified neural circuit.

Provided herein is a method of personalizing a neuromodulation therapy for a subject having an impulsivity-related or uncontrollable behavior, the method comprising (a) generating a circuit-specific brain connectivity profile using a directionality map of water diffusivity based on MRI of the subject; (b) generating a circuit-specific voxel-wise connectivity matrix with the circuit-specific brain connectivity profile to define a region of interest comprising the neural circuit to be targeted; (c) using an algorithm to segment the circuit-specific voxel-wise connectivity matrix to generate a 3D sub-region to identify the neural circuit to be targeted; and (d) personalizing the neuromodulation therapy based on patient-specific neuroimaging, brain connectivity, cortical thickness, clinical and behavioral complains, previous responses to neuromodulation, and other available clinical and behavioral covariates of the subject.

In some embodiments, the MRI is a diffusion, structural, and/or functional resting-state MRI.

In some embodiments, the algorithm is selected from the group consisting of k-means clustering algorithm, independent component analysis, principal component analysis, stochastic relaxation with a decoder perturbation, random search among centroids, and hierarchical clustering algorithms.

In some embodiments, the region of interest is selected from the group consisting of nucleus accumbens (NAc), anterior limb of the internal capsule (ALIC), subthalamic nucleus (STN), subthalamic nucleus (STN), thalamus, ventromedial prefrontal cortex (vmPFC), anterior cingulate cortex (ACC), orbitofrontal (OFC)/frontopolar cortex (FP), and dorsomedial/dorsolateral prefrontal cortex. In some embodiments, the region of interest is nucleus accumbens (NAc).

In some embodiments, the identified neural circuit is selected from the group consisting of ventromedial prefrontal cortex (vmPFC)-NAc circuit, orbitofrontal/frontopolar cortex-ALIC circuit, orbitofrontal/frontopolar cortex-thalamus circuit, vmPFC-NAc circuit, ACC-NAC circuit, dorsal prefrontal cortex-vmPFC-NAc circuit. In some embodiments, the identified neural circuit is vmPFC-NAc circuit. In some embodiments, the neuromodulation therapy is invasive or non-invasive.

In some embodiments, the neuromodulation therapy selected from the group consisting of deep brain stimulation, focused ultrasound, transcranial magnetic stimulation, transcranial electrical stimulation, radiomodulation, and neuroablation.

In some embodiments, the impulsivity-related or uncontrollable behavior is selected from the group consisting of (1) a pathologic impulsivity-related behavior marked by loss of control; (2) a pathological impulsivity or compulsive behavior related to uncontrollable repetitive thoughts; (3) an uncontrollable compulsive behavior related to obsessive thoughts; (4) a pathologic behavior marked by uncontrollable tics, urges and compulsions; (5) a pathologic impulsivity-related behavior marked by loss of control; (6) a pathologic impulsivity and uncontrollable behavior marked by issues with cognitive control and cognitive flexibility; (7) a pathologic impulsivity, loss of control and compulsive behaviors related to obsessive thoughts and urges; and (8) a pathologic behavior marked by loss of control and/or impaired of motivation. In some embodiments, the impulsivity-related or uncontrollable behavior is selected from the group consisting of loss of control eating, binge-eating, purging, craving, binge-drinking, self-harm, aggressiveness, substance abuse, compulsive cleaning/washing, compulsive checking, compulsive gambling, trichotillomania, and skin-picking.

Each of the aspects and embodiments described herein are capable of being used together, unless excluded either explicitly or clearly from the context of the embodiment or aspect.

BRIEF DESCRIPTION OF THE DRAWINGS

The features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 1A is a graph showing connectivity index between the vmPFC and NAc (Kruskal-Wallis chi-squared=9.2052, P=0.01). Post hoc pairwise comparisons showed decreased right and left connectivity indices in the obese (n=13) compared to the lean (n=19) and WNL (n=16) cohorts.

FIG. 1B is a graph showing connectivity index between the vmPFC and NAc (Kruskal-Wallis chi-squared=14.375, P=0.0007). Post hoc pairwise comparisons showed decreased right and left connectivity indices in the obese (n=13) compared to the lean (n=19) and WNL (n=16) cohorts.

FIG. 1C shows decrease in vmPFC-NAc streamline probability in obese subjects. Group average map of vmPFC-NAc streamline probability (yellow for high; red for low) are illustrated in sagittal, coronal, and axial views. Individual subject's probabilistic tractography results were transformed into standard MNI152 09c space and averaged across cohorts. Regions of interest were defined in standard space. The NAc masks (white) adapted from CIT168 Subcortical In Vivo Probabilistic Atlas and the vmPFC masks (green) defined based on the Harvard-Oxford cortical atlas.

FIG. 1D is a graph showing BMI was inversely related to the right (rho=−0.51, P<0.01, two-tailed) and left (rho=−0.48, P<0.01, two-tailed) vmPFC-NAc connectivity indices in the overall binge-prone cohort (n=37).

FIG. 1E is a graph showing BMI was not related to the left (blue) or right (red) vmPFC-NAc connectivity index in the WNL cohort. N.S.=non-significant. *=P<0.05. =P<0.01. *=P<0.001.

FIG. 2A is a graph showing obese cohort presented significantly lower right vmPFC thickness than the lean cohort (P=02).

FIG. 2B is a graph showing differences in left vmPFC thickness between obese and lean cohort did not reach statistical significance (P=0.15). In the overall binge-prone cohort (n=37)

FIG. 2C is a graph showing BMI was found to be inversely correlated to the right (rho=−0.42, P<0.05, two-tailed) and marginally to left (rho=−0.29, P=0.09, two-tailed) vmPFC thickness.

FIG. 2D is a graph showing vmPFC-NAc connectivity index was correlated with right (rho=0.50, P<0.01, two-tailed) vmPFC thickness and marginally with left (rho=0.31, P=0.06, two-tailed). N.S.=non-significant. *=P<0.05. **=P<0.01.

FIG. 3A is a graph showing Beck's Depression Inventory (BDI) score was increased in the obese compared to the lean cohort (P=0.02).

FIG. 3B is a graph showing presence of depression (i.e., BDI≥10) was significantly different between obese and lean cohorts ($\chi^2$=6.3; P=0.01).

FIG. 3C is a graph showing correlations between BMI and left (rho=−0.44, P=0.008, two-tailed) and right (rho=−0.52, P=0.002, two-tailed) vmPFC-NAc connectivity index remained significant after including BDI score as a covariate (Connectivity Index|BDI).

FIG. 3D is a graph showing right vmPFC thickness (rho=−0.42, P=0.01, two-tailed) also remained significant after including BDI score as a covariate (vmPFC Thickness|BDI). N.S.=non-significant. *=P<0.05. **=P<0.01.

FIG. 4A is shows group average streamline probability in normative dataset of 178 HCP subjects between the NAc and the vmPFC from lower (red) to higher (yellow).

FIG. 4B is shows group average atlas of NAc shell (red) and core (blue) subregions in standard space based on the distribution of these streamlines in 178 subjects from the Human Connectome Project. Voxels present in less than 40% of the subjects were excluded.

FIG. 4C is a graph showing significantly higher normalized streamline counts were also observed between the vmPFC and the left (P<0.001) and right (P<0.001) NAc shell as compared to the NAc core in subjects with binge eating (n=37).

FIG. 4D is a graph showing the vmPFC-NAc shell rsFC was significantly lower in obese cohort (P=0.04).

FIG. 4E is a graph showing negatively correlated with BMI (rho=−0.36; P=0.04).

FIG. 4F is a case illustration of subject-specific NAc circuit-based target definition using high-resolution clinical diffusion MRI data from obese subjects undergoing responsive DBS as part of the first-in-human clinical trial. The NAc subregion with more robust tractography-defined vmPFC interactions (red, NAc shell) was encompassed by the two distal-most electrode contacts unilaterally in subject 1.

FIG. 4G is a case illustration of subject-specific NAc circuit-based target definition using high-resolution clinical diffusion MRI data from obese subjects undergoing responsive DBS as part of the first-in-human clinical trial. The NAc subregion with more robust tractography-defined vmPFC interactions (red, NAc shell) was encompassed by the two distal-most electrode contacts bilaterally in subject 2.

FIG. 4H shows that initial active stimulation was delivered using left-side electrode contacts only. These electrode contacts encompassed the left-side NAc subregion in subject 2 but not in subject 1.

FIG. 4I is a graph showing that after left-sided stimulation was initiated (as shown in FIG. 4H), subject 1 had no significant changes in mean ELOCS-18 frequency score.

FIG. 4J is a graph showing that after left-side active stimulation was initiated (as shown in FIG. 4H), subject 2 had a significant decrease in mean ELOCS-18 frequency score (59.4% decrease from baseline; U=265, P=0.001). N.S.=non-significant. *=P<0.05. =P<0.01. *=P<0.001.

DETAILED DESCRIPTION

Figure 1A:
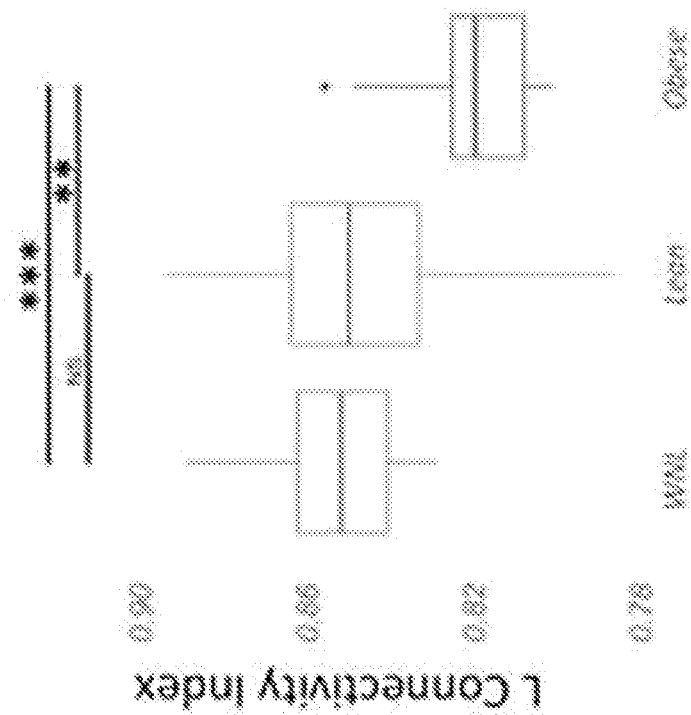
FIGS. 1A-1E show that vmPFC-NAc connectivity indices are decreased in the obese state (a potentially severe clinical complication) of subjects with binge eating.

The following description and examples illustrate embodiments of the present disclosure in detail.

It is to be understood that the present disclosure is not limited to the particular embodiments described herein and as such can vary. Those of skill in the art will recognize that there are variations and modifications of the present disclosure, which are encompassed within its scope.

All terms are intended to be understood as they would be understood by a person skilled in the art. Unless defined otherwise, all technical and scientific terms used herein have the same meaning as commonly understood by one of ordinary skill in the art to which the disclosure pertains.

The section headings used herein are for organizational purposes only and are not to be construed as limiting the subject matter described.

Although various features of the disclosure can be described in the context of a single embodiment, the features can also be provided separately or in any suitable combination. Conversely, although the present disclosure can be described herein in the context of separate embodiments for clarity, the present disclosure can also be implemented in a single embodiment.

Definition

The following definitions supplement those in the art and are directed to the current application and are not to be imputed to any related or unrelated cases, e.g., to any commonly owned patent or application. Although any methods and materials similar or equivalent to those described herein can be used in the practice for testing of the present disclosure, the preferred materials and methods are described herein. Accordingly the terminology used herein is for the purpose of describing particular embodiments only, and is not intended to be limiting.

In this application, the use of the singular includes the plural unless specifically stated otherwise. It must be noted that, as used in the specification, the singular forms "a", "an", and "the" include plural referents unless the context clearly dictates otherwise.

In this application, the use of "or" means "and/or" unless stated otherwise. The terms "and/or" and "any combination thereof" and their grammatical equivalents as used herein, can be used interchangeably. These terms can convey that any combination is specifically contemplated. Solely for illustrative purposes, the following phrases "A, B, and/or C" or "A, B, C, or any combination thereof" can mean "A individually; B individually; C individually; A and B; B and C; A and C; and A, B, and C". The term "or" can be used conjunctively or disjunctively, unless the context specifically refers to a disjunctive use.

Furthermore, the use of the term "including" as well as other forms, such as "include", "includes" and "included", is not limiting.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the present disclosures.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. It is contemplated that any embodiment discussed in this specification can be implemented with respect to any method or composition of the disclosure, and vice versa. Furthermore, compositions of the present disclosure can be used to achieve methods of the present disclosure.

Overview

Obesity is a growing worldwide public health crisis that is at least in part due to uncontrolled eating of readily available, highly palatable and refined foods (Stice et al., 2013). Loss of inhibitory control over how much one eats has repeatedly been associated with refractoriness of obesity to even the most aggressive of available treatments (Lavagnino et al., 2016a; White et al., 2010). Binge eating may be the most extreme behavioral ramification of loss of inhibitory control given the quantity of food consumed in one episode (American Psychiatric Association, 2013; Ho et al., 2015). Perhaps not surprisingly, obesity is 3-6 times more common among subjects engaging in binge eating (Kessler et al., 2013). Binge eating not only exacerbates treatment outcomes for obesity, it also predisposes individuals to impaired metabolic function, psychiatric comorbidities and quality of life, in part, due to higher rates of type 2 diabetes and debilitating preoccupations with food (Chao et al., 2016; Grucza et al., 2007; McCuen-Wurst et al., 2018). Thus, examining the neural underpinnings of obesity and binge eating may elucidate shared neural circuits, uncover disease mechanisms not previously understood, and guide neuromodulatory interventions tailored to these commonly coexisting conditions (Stice et al., 2013).

Nucleus accumbens (NAc) deep brain stimulation (DBS) is one neuromodulatory strategy that has exhibited promise in ameliorating binge-eating behavior and inducing weight loss in mice (Halpern et al., 2013; Wu et al., 2018). Single cases of human subjects with obesity undergoing NAc DBS and experiencing restored inhibitory control and substantial weight loss have also been reported (Mantione et al., 2010; Tronnier et al., 2018). These effects may involve retrograde activation of the ventromedial prefrontal cortex (vmPFC) given increased induction of c-Fos expression and increased blood-oxygenation-level-dependent signal observed specifically in the vmPFC across small and large animal species, respectively, during NAc DBS (Cho et al., 2019; Vassoler et al., 2013). These findings are not surprising, as the vmPFC-NAc circuit has been repeatedly described to mediate inhibitory control over food among other substances (Richard and Berridge, 2013; Vassoler et al., 2013). Pharmacologic inactivation of rat vmPFC has led to the emergence of behavioral disinhibition in a cued appetitive task (Ghazizadeh et al., 2012). Conversely, local vmPFC activation has suppressed appetitive eating (Richard and Berridge, 2013). Thus, the therapeutic effects of NAc DBS in collectively treating obesity and binge eating are likely due, at least in part, to modulation of vmPFC and NAc interactions (Bossert et al., 2012; Cartmell et al., 2019; Pierce and Vassoler, 2013).

Methods of Targeting Neural Circuits

Provided herein are multimodal imaging analysis to examine and target this putative circuit. Provided herein are (i) investigating the relationship between body mass index (BMI), vmPFC-NAc structural connectivity and vmPFC thickness in females engaging in binge eating, accounting for available clinical and behavioral covariates; (ii) use of state-of-the-art, normative diffusion MRI dataset from the Human Connectome Project (HCP) to localize where streamlines between the NAc and vmPFC converge within the NAc; (iii) applying this localization to the clinical sample of females engaging in binge eating; (iv) testing, in the same binge eating sample, the resting-state functional connectivity (rsFC) of the uncovered NAc target region and its relationship with obesity to examine the functional relevance of this NAc subregion; and (v) assessing feasibility of directly modulating this vmPFC-NAc circuit guided by probabilistic tractography in two subjects undergoing NAc responsive DBS as part of the first-in-human clinical trial for loss of control eating in refractory obesity (ClinicalTrials.gov Identifier: NCT03868670) (Wu et al., 2020).

Provided herein is the first study to (i) find condition-specific effects on the vmPFC-NAc circuit associated with obesity among subjects with binge eating, (ii) define a circuit-based NAc target for obesity based on the specific interactions that it sustains with the vmPFC, and (iii) demonstrate feasibility of a direct application of this method for circuit-based targeting.

This study is timely given an ongoing first-in-human trial of responsive NAc DBS for patients with obesity and loss of control eating behaviors, such as binge eating (ClinicalTrials.gov Identifier: NCT03868670) (Wu et al., 2020). More than a decade of functional neuroimaging studies carried out in adult volunteers have revealed associations between prefrontal activity (including the vmPFC) and BMI (Geha et al., 2017; Volkow et al., 2009). Notwithstanding, associations between vmPFC circuits and BMI are seldom reported in structural imaging studies. Widespread white-matter microstructure alterations have been reported in subjects with binge eating (He et al., 2016); however, white-matter alterations specific to individuals with binge eating and obesity have not been explored.

The present disclosure is the first to provide evidence supporting decreased structural connectivity between NAc and vmPFC in females with comorbid obesity and binge eating compared to lean females with binge eating alone and WNL controls. This finding likely represents that the vmPFC-NAc is perturbed in subjects with obesity and binge eating. Furthermore, the finding that BMI was inversely related to the vmPFC-NAc tractography-CI supports impairment in this brain circuit in the obese cohort and perhaps even a vulnerability (Ghazizadeh et al., 2012; Rapuano et al., 2020). The present disclosure provides that cortical thickness within the vmPFC region is decreased in the obese cohort, and inversely related to BMI. Perhaps not surprisingly, vmPFC-NAc circuit perturbation is accompanied by thinning of the vmPFC in the obese cohort, what may represent a predisposition for obesity in some subjects. Provided herein is evidence for this association in the correlation between vmPFC-NAc tractography-CI and vmPFC thickness.

Clinical measures of depression, anxiety and emotion regulation have been reported to be impaired in obese subjects with a history of binge eating (Grucza et al., 2007; Kessler et al., 2013). When comparing the obese cohort with the lean cohort using a psychiatric battery of scales, the only variable found to differ between these cohort was the BDI score. Moreover, the vmPFC-NAc circuit has repeatedly been implicated in mediating mood states (Riva-Posse et al., 2018; Vassoler et al., 2013; Winecoff et al., 2013). Nevertheless, this measure of depression did not fully explain the key finding that BMI negatively impacts structural connectivity of the vmPFC-NAc circuit.

It was previously found using diffusion MRI data from the HCP as well as a single case study that probabilistic tractography can be utilized to subdivide the human NAc into core (dorsolateral) and shell (ventromedial) subregions based on whole-brain connectivity profiles (Cartmell et al., 2019). This methodology has been applied successfully to other brain regions as well (Kakusa et al., 2021). In preclinical models, changes in neuronal activation in the vmPFC following NAc DBS have been demonstrated across species (Cho et al., 2019; Vassoler et al., 2013).

Provided herein confirms that two NAc subregions can be differentiated using probabilistic tractography based on its connectivity to the vmPFC alone; with the NAc shell concentrating most vmPFC streamlines, presumably representing the NAc subregion that is functionally correlated with obesity in subjects with binge eating. This tractography-defined subregion was found to be the area with the higher number of vmPFC streamlines in both HCP subjects and the binge-prone cohort. This is in line with the previous findings using synaptic tracing and CLARITY-based 3D histology tractography in mice and diffusion MRI tractography in humans, as it had also been demonstrated in rodents and primates (Bossert et al., 2012; Cartmell et al., 2019; Haber et al., 2006).

The functional relevance of this NAc shell subregion with a higher number of vmPFC streamlines is supported by decreased rsFC of this vmPFC-NAc shell circuit in the obese cohort. Moreover, negative correlations of BMI to rsFC within this circuit supports disease-specific alterations even further. This is in line with previous empirical imaging assays and computational models that found robust the relationship between tractography and rsFC where structural connections are present (Honey et al., 2009).

Provided herein demonstrates the feasibility of the immediate clinical application of this novel targeting methodology using clinical diffusion MRI. The feasibility of targeting the NAc shell was confirmed by evaluating lead placement in postoperative imaging merged to circuit-based target. In fact, modulating this circuit with responsive DBS exhibited a not surprisingly causal relationship between this circuit and the subject's inhibitory control over eating given preliminary restoration in self-control. The reproducibility of this circuit-based target definition using different clinical diffusion MRI parameters, including a widely available diffusion MRI protocol, will pave the path forward for wide application of such a targeting method to modulate the vmPFC-NAc circuit. The ultimate implication of these findings is the implementation of novel, personalized, circuit-based targeting to optimize neuromodulatory treatment for subjects with refractory obesity and binge eating.

It is intended that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All patent filings, websites, other publications, accession numbers and the like cited above or below are incorporated by reference in their entirety for all purposes to the same extent as if each individual item were specifically and individually indicated to be so incorporated by reference. If different versions of a sequence are associated with an accession number at different times, the version associated with the accession number at the effective filing date of this application is meant. The effective filing date means the earlier of the actual filing date or filing date of a priority application referring to the accession number if applicable. Likewise, if different versions of a publication, website or the like are published at different times, the version most recently published at the effective filing date of the application is meant unless otherwise indicated. Any feature, step, element, embodiment, or aspect of the disclosure can be used in combination with any other unless specifically indicated otherwise.

Although the present disclosure has been described in some detail by way of illustration and example for purposes of clarity and understanding, it will be apparent that certain changes and modifications can be practiced within the scope of the appended claims.

EXAMPLES

These examples are provided for illustrative purposes only and not to limit the scope of the claims provided herein.

In below examples, multimodal imaging was used to investigate the vmPFC-NAc circuit in a disease state, and decreased vmPFC-NAc structural connectivity and vmPFC thickness was found. Moreover, vmPFC-NAc interactions were more prominent in the NAc subregion of obese subjects with decreased vmPFC functional connectivity. The NAc of two binge-prone obese subjects was invasively modulated. The subject with stimulation encompassing the subregion with more prominent vmPFC interactions reported pronounced improvement in food-specific inhibitory control. Rescuing this circuit aberration uncovered here may restore control over food choices in obesity and related disorders

Example 1. MRI Data and Preprocessing

MRI acquisition parameters are summarized in Table 1.

TABLE 1

Summary of MRI Acquisition Parameters

| Data Type | HCP Dataset Diffusion | Clinical Dataset Diffusion | Structural (T1w) | Resting-state | Clinical Trial Subjects High-resolution Diffusion | Structural (T1w) |
|---|---|---|---|---|---|---|
| Magnetic Field | 7T | 3T | 3T | 3T | 3T | 3T |
| Sequence | Spin-Echo EPI | Spin-Echo EPI | BRAVO | SPIRAL | EPI | BRAVO |
| TE/TR (ms) | 71.2/7000 | 97.5/12800 | 1.87/5.8 | 30/2000 | 70-87*/4571-12235* | 3.2/8.2 |
| Flip Angle (°) | 90 | 90 | 11 | 80 | 90 | 13 |
| Field-of-View (mm²) | 210 | 220 | 230 | 220 | 225 | 220 |
| Matrix Size | 200 (acquisition) × 200 (recon) | 128 (acquisition) × 256 (recon) | 192 (acquisition) × 256 (recon) | 128 (acquisition) × 64 (recon) | 150 (acquisition) × 256 (recon) | 256 (acquisition) × 512 (recon) |
| In-plane Res. (mm²) | 1.05 × 1.05 | 0.8594 × .8594 | 0.9375 × 0.9375 | 3.4 × 3.4 | 0.88 × 0.88 | 0.5 × 0.5 |
| Slice Thickness (mm) | 1.05 | 2.3 | 1.2 | 3.5 | 1.5 | 1 |
| Number of Slices | 132 Axial | 74 Axial | 146 Axial | 31 Axial | 80-98 Axial | 176 Axial |
| Runs | 4 | 1 | 1 | 1 | 1 | 1 |
| Acquisition Time (min) | 9:50 (39:20 total) | 15:23 | 8:40 | 8:00 | 9:59-27:32* | 3:42 |
| Diffusion Encoding (s/mm²) | 6 × b = 0 65 dir. × b = 1000, 65 dir. × b = 2000 | 1 × b = 0 37 dir. × b = 1000 | N/A | N/A | 3-6 × b = 0 128 dir. × b = 1500 | N/A |

*For subject 2, images were acquired in a large-bore clinical scanner.

MRI data from three different cohorts were included: (1) diffusion, structural, and functional resting-state MRI data from 61 females recruited by the Stanford Eating Disorders Program on a 3T MRI scanner (Discovery MR750, GE Healthcare, Milwaukee, Wisconsin); (2) normative diffusion MRI dataset from 178 unrelated subjects from the HCP who underwent a ultra-high-resolution acquisition on a "Magnetom" 7T MRI scanner (Siemens Medical Systems, Erlangen, Germany) were obtained from the publicly available S1200 WashU-Minn-Ox HCP dataset (Glasser et al., 2013; Sotiropoulos et al., 2013; Van Essen et al., 2012); (3) diffusion and structural clinical 3T MRI data from two subjects undergoing electrode placement in the NAc (more details in Assessment of Clinical Application and Case Illustrations). To assess reproducibility of the results using different parameters, two subjects from the clinical trial of responsive DBS for loss of control eating in refractory obesity underwent the high-resolution, diffusion MRI protocol. Given this subject's body habitus, a large-bore MRI scanner was used, requiring 30-min of scan time for the diffusion sequence.

The preprocessing of the T1-weighted image involved the use of the Advanced Normalization Tools (ANTs) cortical thickness pipeline (Avants et al., 2009). An existing template image (figshare.com/articles/ANTs_ANTsR_Brain_Templates/915436) and associated anatomical priors were used to run each image through the pipeline in order to generate a cortical thickness map in subject space. This pipeline involved a number of processing steps, including bias correction (Tustison et al., 2010), brain extraction, n-tissue segmentation, and spatial normalization (Avants et al., 2011a, 2011b). Whereas preprocessing was performed on the diffusion MRI data from the clinical cohort and clinical trial subject to prepare the images for probabilistic tractography using the FSL suite (Andersson et al., 2003; Smith et al., 2004), the normative HCP diffusion MRI data had already been preprocessed (with the minimal preprocessing pipeline). The diffusion-weighted images were corrected for motion and geometric distortions using the 'topup' and 'eddy' functions, similar to that applied in HCP's preprocessing pipeline. For each subject, diffusion and T1-weighted images were co-registered using boundary-based registration. Resting-state fMRI scans from the binge-prone cohort were preprocessed using fMRIPrep 1.2.3 (Esteban et al., 2019). In brief, the preprocessing of the functional image involved skull-stripping, co-registration to the T1 reference image, and head motion and susceptibility distortion corrections. After removal of non-steady state volumes and spatial smoothing with a 6 mm FWHM isotropic Gaussian kernel, ICA-AROMA was used to identify motion-related noise components in the BOLD signal (Pruim et al., 2015). Framewise displacement (FD) and root mean square variance over voxels of the temporal derivative of time courses (DVARS) were calculated (Power et al., 2012, 2014). Global signals were extracted within the cerebrospinal fluid (CSF), white matter (WM), gray matter (GM), and whole-brain masks. XCP Engine 1.0 was used to perform denoising of the preprocessed BOLD output from fMRIPrep, utilizing the estimated confound parameters (Ciric et al., 2017; Parkes et al., 2018). This included demeaning and removal of any linear or quadratic trends and temporal filtering using a first-order Butterworth bandpass filter (0.01-0.08 Hz). These preliminary preprocessing steps were then followed by confound regression of ICA-AROMA noise components, together with mean WM, CSF, and global signal regressors. All regressors were bandpass filtered to retain the same frequency range as the data to avoid frequency-dependent mismatch (Ciric et al., 2017).

Example 2. Demographics, Clinical, and Behavioral Data of Binge Eating Cohort

Subjects' consent was obtained according to the Declaration of Helsinki and approved by the institutional ethical committee (IRB-35204). The available clinical and behavioral data were analyzed from 61 females (mean age=26±5.3 years; BMI=26.8±7.8), 37 of them engaging in binge eating, defined by at least one weekly episode of eating large amounts of food in short periods accompanied by the feeling of loss of control eating over the prior 6 months (i.e., binge-prone cohort; mean age=26±5.6 years; BMI=27.9±8.5; binge frequency=2.7±1.4 episodes/week) (American Psychiatric Association, 2013). The number of binge-eating episodes per week was assessed with the Eating Disorder Examination, a standardized diagnostic interview (Fairburn and Cooper, 1993). The Beck Depression Inventory (BDI) and the Beck Anxiety Inventory were used to screen for depression and anxiety, respectively (Beck et al., 1961, 1988). The Difficulties in Emotion Regulation Scale was used to assess impairment in emotion regulation (Gratz and Roemer, 2004). Subjects were initially divided into three cohorts (Table 2): (1) Within normal limits (WNL) cohort (n=16): BMI<25, less than one weekly episode of binge eating on average over the prior 6 months; (2) lean binge-prone cohort (n=19): BMI<25, at least one weekly episode of binge eating (referred to as lean cohort); (3) obese binge-prone cohort (n=13): BMI>30, at least one weekly episode of binge eating (referred to as obese cohort). Clinical and behavioral variables that differed between lean and obese cohorts were further investigated.

TABLE 2

Summary of Demographics, Behavior, and Imaging Measurements Across Obese, Lean, and within Normal Limits (WNL) Cohorts

| | | Binge-prone Cohorts | | | |
| --- | --- | --- | --- | --- | --- |
| | WNL Cohort n = 16 | Lean n = 19 | Obese n = 136 | Mann-Whitney U | P* |
| Age | 27 ± 4 | 26 ± 6 | 27 ± 6 | 1.01[†] | .60[†] |
| BMI* | 22 ± 1.7 | 21.8 ± 1.7 | 37.2 ± 7.6 | 27.9[†] | .000[†] |
| Binge frequency (per week) | — | 2.5 ± 1.2 | 2.9 ± 1.7 | 108 | .56 |
| BDI-I | — | 10.3 ± 8.0 | 17.2 ± 6.2 | 62 | .02 |
| BDI-I >9 (No/Yes) | — | 11/8 | 1/12 | 6.3[‡] | .01[‡] |
| BAI | — | 11.2 ± 7.6 | 11.2 ± 7 | 119 | .88 |
| BAI >21 (No/Yes) | — | 16/3 | 12/1 | .02[‡] | .89[‡] |
| DERS | — | 89 ± 25 | 102 ± 23 | 96 | .30 |
| NAc-vmPFC R CI[a] | 0.87 ± 0.02 | 0.86 ± 0.02 | 0.85 ± 0.01 | 9.21[†] | .01[†] |
| NAc-vmPFC L CI[a] | 0.85 ± 0.02 | 0.85 ± 0.03 | 0.82 ± 0.02 | 14.38[†] | .001[†] |
| vmPFC thickness R | — | 3.48 ± 0.44 | 3.14 ± 0.4 | 183 | .02 |
| vmPFC thickness L | — | 3.46 ± 0.46 | 3.2 ± 0.57 | 162 | .15 |

*Mann-Whitney U test unless otherwise specified.
[†]Kruskal-Wallis rank sum test.
[‡]$\chi^2$ test, df = 1. Post hoc, pairwise comparisons using Mann-Whitney U test with P values adjusted for false discovery rate when appropriate:
[a]WNL cohort ~ Lean cohort ≠ Obese cohort Example 3. Probabilistic Tractography Probabilistic tractography was used to evaluate the connections between NAc and vmPFC. The NAc mask was defined on the standard T1 MNI152 09c template adapted from CIT168 Subcortical In Vivo Probabilistic Atlas (Pauli et al., 2018), while the vmPFC mask was defined using the Harvard-Oxford brain atlas, as used previously (Dunlop et al., 2017). This registration was performed using Advanced Normalization Tools (ANTs), which consists of two successive steps of linear and nonlinear registration between the subject's brain and the MNI brain. In a third step, the MNI-defined ROIs were registered to subject's space.

FSL's Bayesian Estimation of Diffusion Parameters Obtained using Sampling Techniques (BEDPOSTX) was used to conduct Monte Carlo sampling of probability distribution of diffusion parameters at each voxel, accounting for up to three crossing fibers directions within a voxel (Behrens et al., 2007). Fiber tracking was performed with FSL's Probtrackx2, using distance correction and each NAc voxel as seed and the vmPFC as target (Jenkinson et al., 2012). A total of 5000 seed points were used to generate streamlines from each seed voxel, and only the streamlines that reached the target were retained for further analysis. The results of Probtrackx are summarized in a map of "streamline probability", which gives the probability for each seed voxel to reach the target. The waytotal represents the total number of streamlines from a given seed that reached the target.

Example 4. Measurement of Cortical Thickness

The same vmPFC mask was used in a cortical thickness analysis performed to assess whether BMI correlated to thinning of vmPFC among subjects with binge eating. ANTs was used to perform registration between the MNI template and the template used in the cortical thickness pipeline (Avants et al., 2009). These transforms were composed with the template-to-subject transforms from the pipeline to transform the vmPFC labels into subject space. Of note, the cortical thickness analysis was conducted using public scripts from the Penn Image Computing and Science Laboratory (https://github.com/ANTsX/ANTs/tree/master/Scripts), whereas the tractography-based analysis was performed using an in-house developed script, thus slightly modified different normalization approaches were applied, both using ANTs. These subject-space labels were then used, along with the voxel-wise cortical thickness maps, to calculate mean cortical thickness of the vmPFC.

Example 5. Nucleus Accumbens Segmentation

Tractography was used to subdivide each of the 356 NAc (178 subjects) from the normative HCP dataset based on each individual distribution of streamlines between the NAc and vmPFC to define the region within the NAc where the vmPFC streamline are more densely located.

This analysis was performed to define the NAc subregions in the normative HCP data and then applied these subregions to the binge-prone cohort. The averaged streamline probability maps of NAc voxels to the vmPFC was computed to obtain the normative weighted average group map of streamline probability between the NAc and the vmPFC across the 178 HCP subjects. Connectivity matrices were also generated for each subject. The connectivity matrices store the number of streamlines between the rows (seed) and the columns (target) and can be used for blind classification. K-means was used to segment individual NAc based on these connectivity matrices. This hypothesis-free method uses successive iterations to assign each voxel to one of two clusters, without the application of external spatial constraints. For the case of large inter-voxel similarities in streamline count, the algorithm fails to identify two distinct clusters. The frequency that k-means identified two distinct NAc clusters based on its connectivity to the vmPFC was assessed. Each subject's resulting clusters were transformed to standard MNI space and concatenated into a reference atlas of the NAc based on its connectivity to the vmPFC. This can be useful for presurgical consultation and help planning stereotactic surgeries targeting the NAc in settings where advanced diffusion MRI techniques are not available. Finally, the normative clusters was co-registered to the clinical cohort MRI images to assess the number of streamlines from each cluster (seed) to the vmPFC.

Example 6. Resting-State Functional Connectivity Analysis

Resting-state functional connectivity analysis was performed on the binge-prone cohort's preprocessed resting-state fMRI data using DPABI 4.3/DPARSF which is based on Statistical Parametric Mapping (SPM12, www.fil.ion.ucl.ac.uk/spm) (Yan et al., 2016). Three subjects were excluded due to excessive movement as measured by 1) mean FD>0.2 mm, 2) more than 20% of FD over 0.2 mm, or 3) any FD>5 mm (Parkes et al., 2018). A seed-based approach was performed to examine rsFC in the binge-prone cohort (n=34) by calculating the rsFC between the same vmPFC and the NAc masks as defined above and each tractography-defined NAc subregion. Functional connectivity values were extracted for all subjects and utilized in further correlational analyses.

Example 7. Statistical Analysis

The strength of the connections between seed and target was expressed as a tractography connectivity index (tractography-CI), as defined by Tschentscher et al. in a previous study by the formula: $\log(waytotal)/\log(5000 \times Vseed)$ (Tschentscher et al., 2019). The waytotal resulting from the tractography was log-transformed and divided by the log-transformed product of the generated sample streamlines in each seed voxel (5000) and the number of voxels in the respective seed mask (Vseed). The log-transformation increased the likelihood of reaching normality, which was tested using the Shapiro-Wilk test (Royston, 1992). Statistical analyses were performed using the RStudio Version 1.2.5042 (RStudio, Inc.). The Kruskal-Wallis test was used to compare vmPFC-NAc tractography-CI between obese, lean and WNL cohorts. Mann-Whitney U Test was used to compare vmPFC thickness as well as rsFC between NAc (and subregions) and vmPFC in obese and lean cohort. Spearman's correlation coefficients (rho) corrected for age were computed separately between BMI and (1) tractography-CI, (2) vmPFC thickness and (3) rsFC. Correction for age was applied given previously described effects of age in white-matter tracts and cortical thickness (Davis et al., 2009; Salat et al., 2004). Mann-Whitney U Test was used to compare the corrected number of streamlines between the vmPFC and NAc subregions in the binge-prone cohort. Significance was defined by $P<0.05$ for all tests with false discovery rate (FDR) correction for multiple comparisons where appropriate.

Example 8. Assessment of Clinical Application and Case Illustrations

After verifying involvement of vmPFC-NAc tractography-CI and vmPFC thickness in binge-prone subjects with obesity and defining the best target within the NAc to modulate the vmPFC-NAc circuit in the high-resolution dataset, the feasibility of invasively stimulating this NAc subregions guided by Tractography was assessed. A high-resolution diffusion preoperative MRI protocol was used in two morbidly obese subjects with binge eating disorder undergoing bilateral NAc responsive deep brain stimulation in the first-in-human clinical trial (MRI protocol details are summarized in Table 1). The Eating Loss of Control Scale (ELOCS-18) was used to examine frequency of uncontrolled eating-related feelings or behaviors in the prior 28 days (Blomquist et al., 2014). ELOCS-18 frequency scores at baseline and after initiation of stimulation were analyzed. Subject 1 was a 45-year-old female (BMI=46 kg/m2) with a mean Eating Loss of Control Scale (ELOCS-18) frequency score of 6.7. Subject 2 was a 56-year-old female, meeting criteria for morbid obesity (BMI=48.9 kg/m2) with a mean ELOCS-18 frequency score of 13.3. Both subjects reported to turn to food to deal with stress, however, they had no current diagnosis of mood or anxiety disorders. The BDI and the Positive and Negative Affect Schedule (PANAS) were used to screen for depression and evaluate changes in positive and negative affective throughout the study (Beck et al., 1961; Watson et al., 1988). These subjects had failed multiple treatments for obesity, including pharmacological and non-pharmacological therapies as well as Roux-en-Y gastric bypass per the study protocol (ClinicalTrials.gov Identifier: NCT03868670) (Wu et al., 2020). Informed consent was obtained prior to enrollment. Study protocol was approved by the institutional ethical committee (IRB-46563) and the U.S. FDA under an investigational device exemption (IDE G180079).

Subject-specific, tractography-defined, NAc subregions were delineated in the subjects' MRI and loaded in the Elements stereotactic planning software (Brainlab, Germany). The trajectories were planned according to published stereotactic coordinates used to target the NAc (Cartmell et al., 2019; Kakusa et al., 2019; Nauczyciel et al., 2013), and then optimized with direct targeting using the Fast Gray Matter Acquisition T1 Inversion Recovery (fGATIR) and T1 images, as well as tractography to ensure lead placement encompassed the NAc subregions with a higher number of streamlines to the vmPFC. Postoperative lead reconstruction was performed by co-registering the postop CT images to preoperative MRI to confirm lead placement in relation to the personalized tractography-defined NAc subregions. One week of responsive stimulation was initiated under blinded conditions unilaterally using the left lead only to align with preclinical work (Halpern et al., 2013). Stimulation was triggered by a continuous biomarker detector (Neurostimulator; model RNS-320; NeuroPace) programmed to identify a preliminary candidate biomarker defined offline to capture pre-binge moments as previously described (Wu et al., 2020). Stimulation parameters were defined for each subject according to responses to in-clinic acute stimulation assessment. Both subjects were blinded to stimulation settings (e.g., stim vs. sham). Mann-Whitney U Test was used to compare ELOCS-18 frequency scores at baseline and after active stimulation was initiated. The baseline timepoint for the ELOCS-18 frequency score reflected a 28-day period in which the patient did not receive any stimulation. The stimulation timepoint for the ELOCS-18 frequency score reflected a 28-day period that encompassed the week of active stimulation.

Example 9. Decreased vmPFC-NAc Structural Connectivity in Obese Cohort

Summary of imaging acquisition parameters are described in Table 1. The available clinical and behavioral data were analyzed from 61 females (mean age=26±5.3 years; BMI=26.8±7.8), 37 of them engaging in binge eating, defined by at least one weekly episode of eating large amounts of food in short periods accompanied by the feeling of loss of control eating over the prior 6 months (i.e., binge-prone cohort; mean age=26±5.6 years; BMI=27.9±8.5; binge frequency=2.7±1.4 episodes/week) (American Psychiatric Association, 2013). Subjects were initially divided into three cohorts: (1) Within normal limits (WNL) cohort (n=16): BMI<25, less than one weekly episode of binge eating on average over the prior 6 months; (2) lean binge-prone cohort (n=19): BMI<25, at least one weekly episode of binge eating (referred to as lean cohort); (3) obese binge-prone cohort (n=13): BMI>30, at least one weekly episode of binge eating (referred to as obese cohort). Demographics, behavior, and imaging measurements of these cohorts are described in Table 2.

Figure 1B:
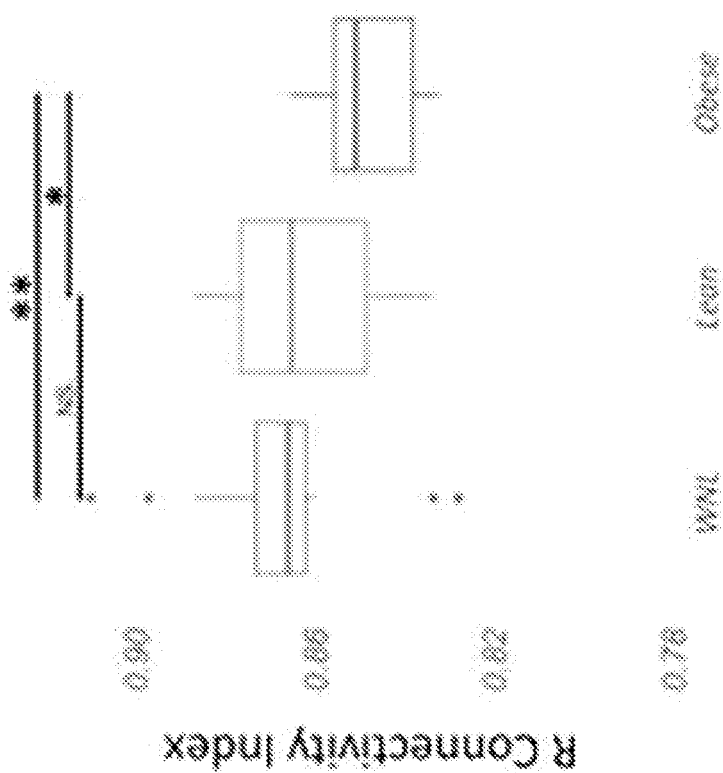
Figure 1C:
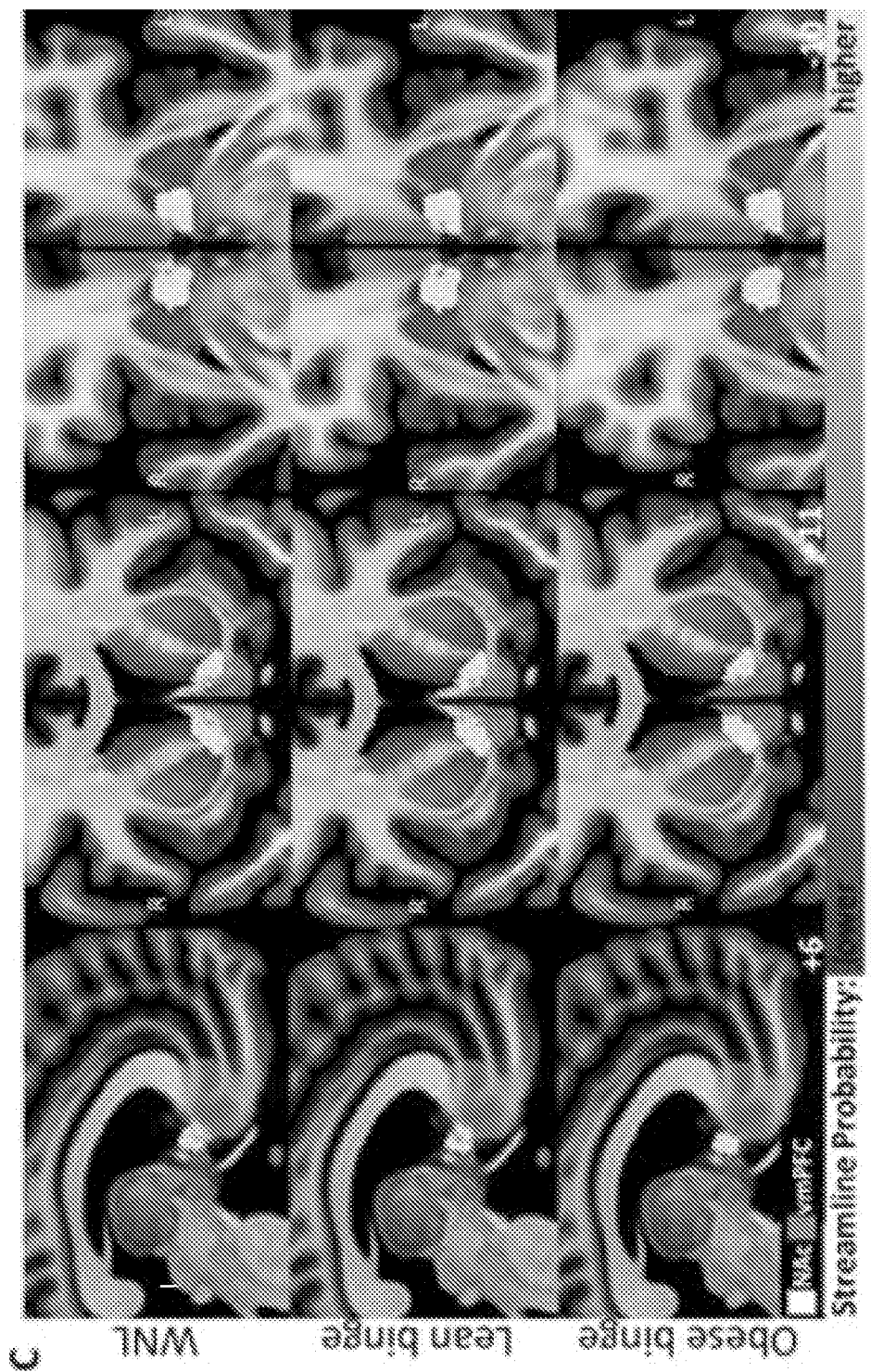

The vmPFC-NAc tractography connectivity index (tractography-CI), as defined by Tschentscher et al. (Tschentscher et al., 2019), was found significantly different among cohorts in both the right hemisphere (Kruskal-Wallis chi-squared=9.2052, P=0.01) and the left hemisphere (Kruskal-Wallis chi-squared=14.375, P=0.0007) (FIGS. 1A-1C). Post hoc pairwise comparisons showed that compared to lean and WNL cohorts, the obese cohort have decreased right tractography-CI (U=182, P<0.05; U=174, P<0.01; FDR-adjusted) and left (U=200, P<0.01; U=187, P<0.001; FDR-adjusted) tractography-CI. Correlations of behavioral and imaging measurements with BMI in WNL cohort and binge-prone cohort are described in Table 3.

TABLE 3

Correlation of Behavioral and Imaging Measurements with BMI Among Within Normal Limits (WNL) and Binge-Prone Cohorts

|  | WNL Cohort n = 16 | | Binge-prone Cohort n = 37 | |
| --- | --- | --- | --- | --- |
|  | Spearman's rho | P* | Spearman's rho | P* |
| Binge frequency × BMI | — | — | .04 | .81 |
| BDI-I × BMI | .28 | .32 | .34 | .04 |
| BAI × BMI | .30 | .27 | −.01 | .94 |
| DERS × BMI | −.06 | .84 | .21 | .22 |
| NAc-vmPFC R CI × BMI | .18 | .51 | −.51 | .001 |
| NAc-vmPFC L CI × BMI | −.21 | .45 | −.48 | .03 |
| vmPFC thick R × BMI | — | — | −.42 | .01 |
| vmPFC thick L × BMI | — | — | −.29 | .09 |

*Spearman correlation corrected for age.

Figure 1D:
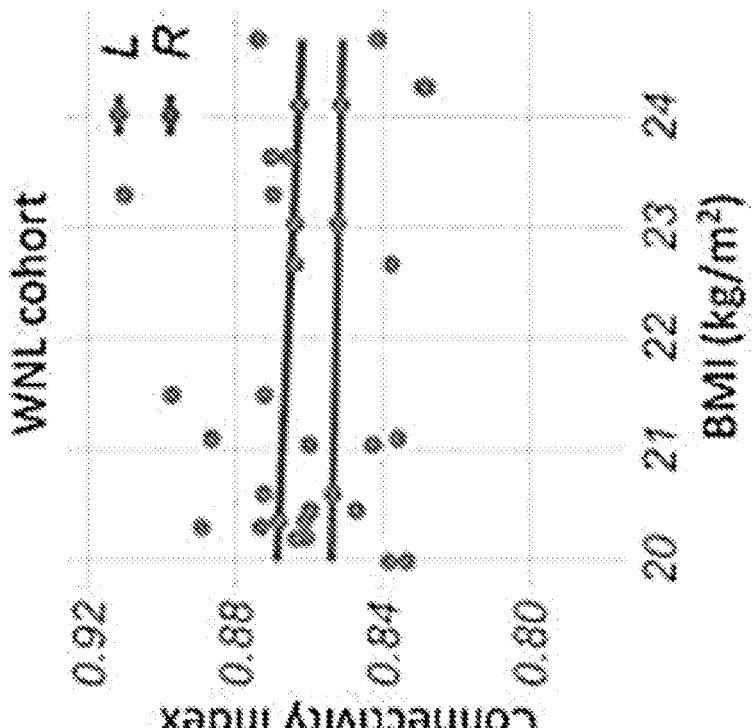
Figure 1E:
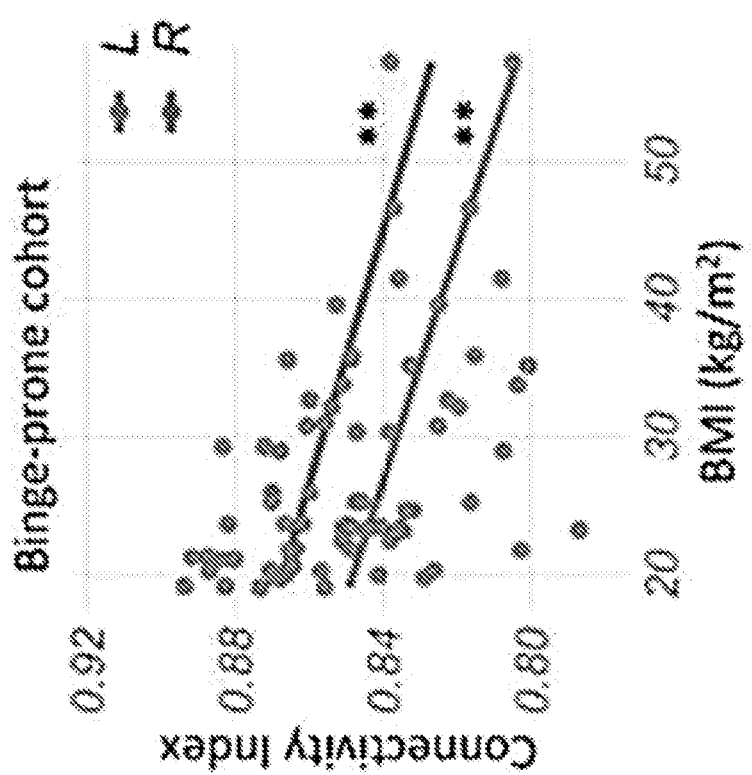

BMI was inversely correlated with the right vmPFC-NAc tractography-CI (rho=−0.51, P<0.01, two-tailed) and the left vmPFC-NAc tractography-CI (rho=−0.48, P<0.01, two-tailed) across the overall binge-prone cohort (FIG. 1D), which included all subjects with at least one weekly episode of eating large amounts of food in short periods accompanied by the feeling of loss of control eating over the prior 6 months (n=37). In WNL cohort, BMI was not correlated with the right vmPFC-NAc tractography-CI (rho=0.18, P=0.51, two-tailed) or the left vmPFC-NAc tractography-CI (rho=−0.21, P=0.45, two-tailed) FIG. 1E).

Example 10. Decreased vmPFC Thickness in Obese Cohort

Figure 2A:
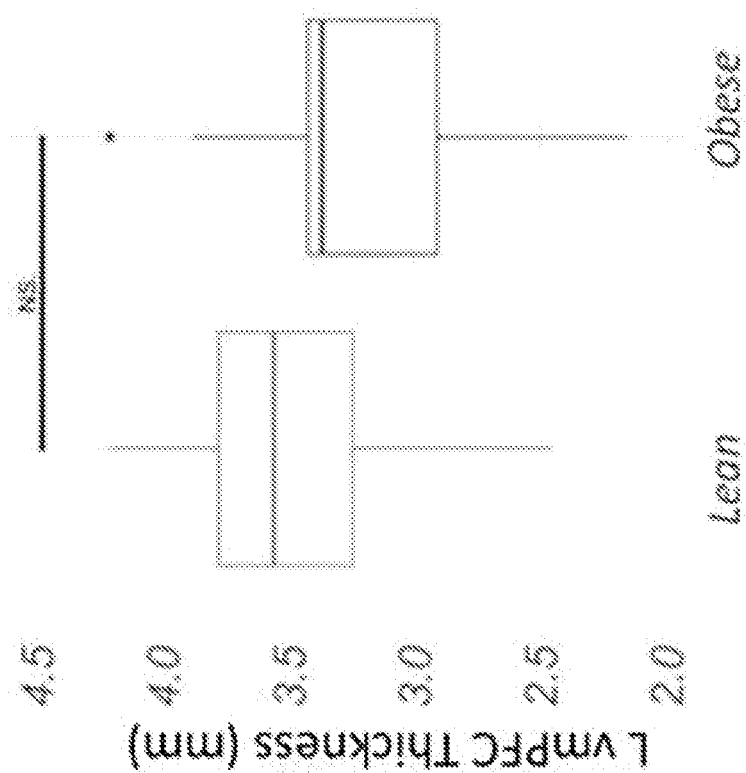
FIGS. 2A-2D show that vmPFC thickness is inversely related to BMI in subjects with binge eating.
Figure 2B:
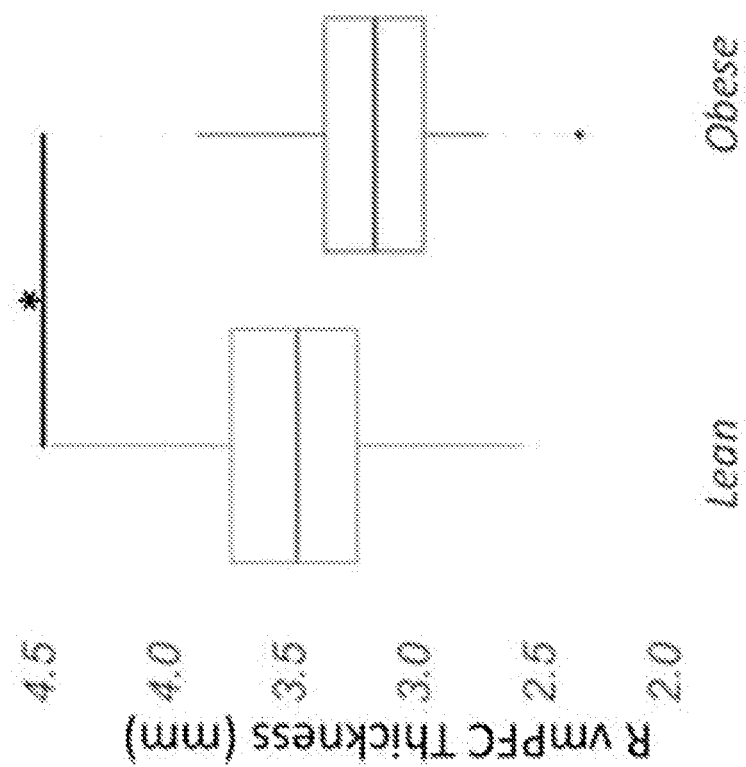
Figure 2D:
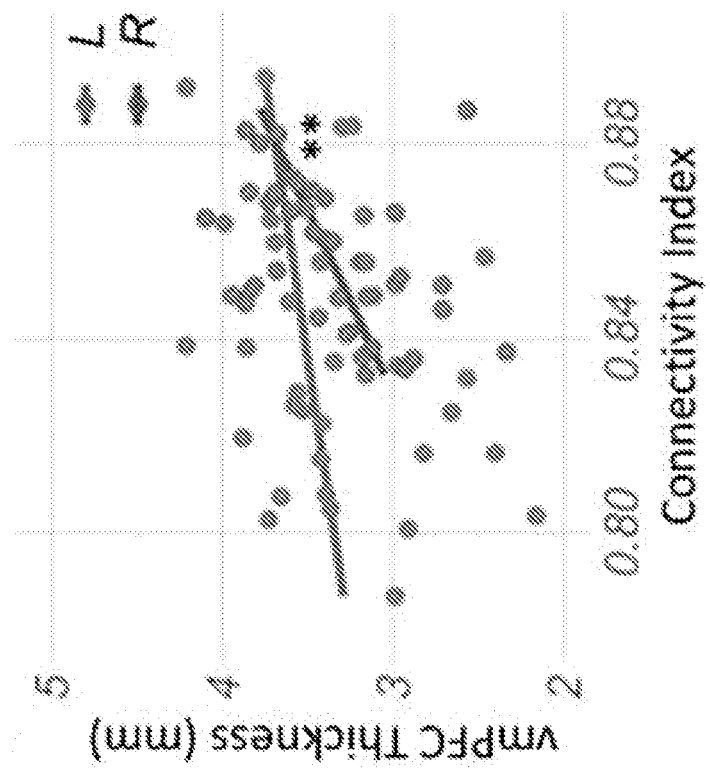
Figure 2C:
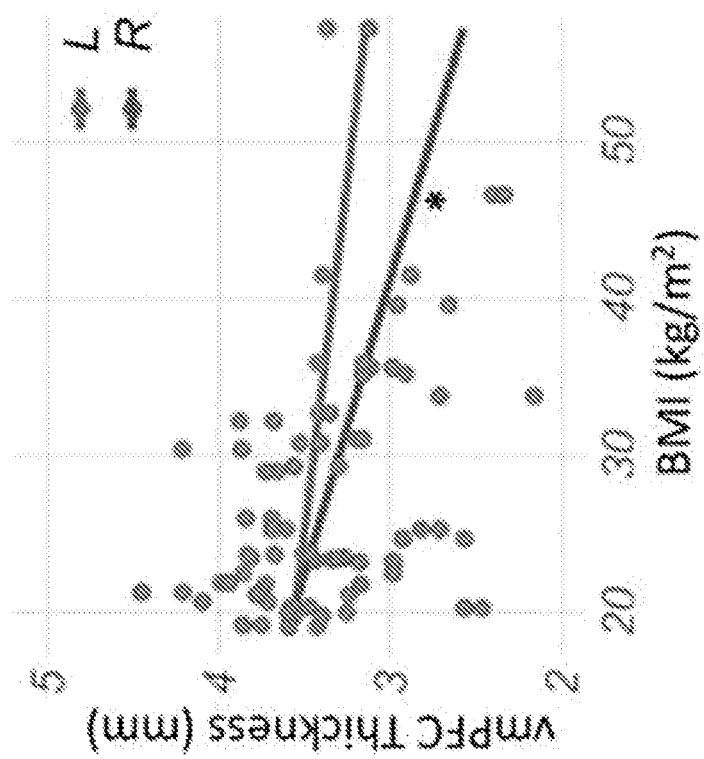

In light of the structural connectivity findings in the binge-prone cohort that showed BMI negatively correlated with vmPFC-NAc tractography-CI, whether there was a relationship between vmPFC thickness and BMIs was assessed. Indeed, the obese cohort had significantly decreased vmPFC thickness compared to the lean cohort (U=183, P=0.02) on the right side (FIG. 2A), although decreased vmPFC thickness did not reach statistical significance on the left side (U=162, P=0.15) (FIG. 2B). BMI was correlated with the right vmPFC thickness (rho=−0.42, P<0.05, two-tailed) and marginally correlated with the left vmPFC thickness (rho=−0.29, P=0.09, two-tailed) across the binge-prone cohort (FIG. 2C). Finally, vmPFC-NAc tractography-CI significantly correlated with the right vmPFC thickness (rho=0.50, P<0.01, two-tailed) and marginally with the left vmPFC thickness (rho=0.31, P=0.06, two-tailed) (FIG. 2D).

Example 11. Depression Scores do not Explain vmPFC-NAc Correlations with BMI

Figure 3B:
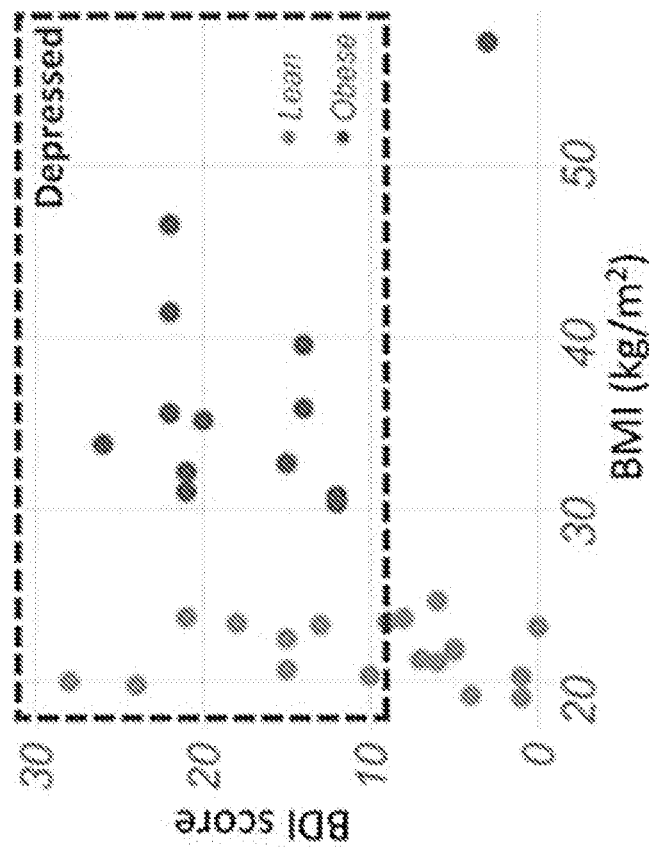
FIGS. 3A-3D show that depression scores do not explain vmPFC-NAc connectivity index and vmPFC thickness correlations with BMI among subjects with binge eating.
Figure 3A:
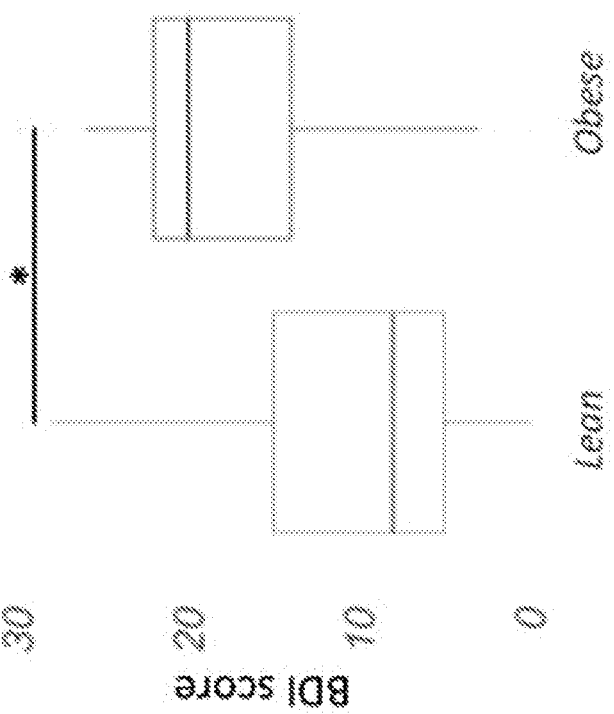
Figure 3D:
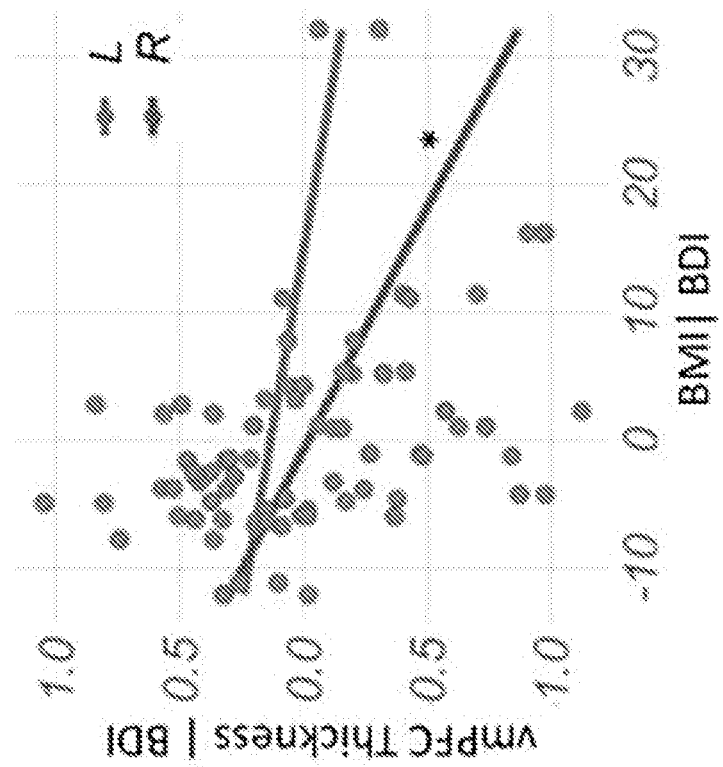
Figure 3C:
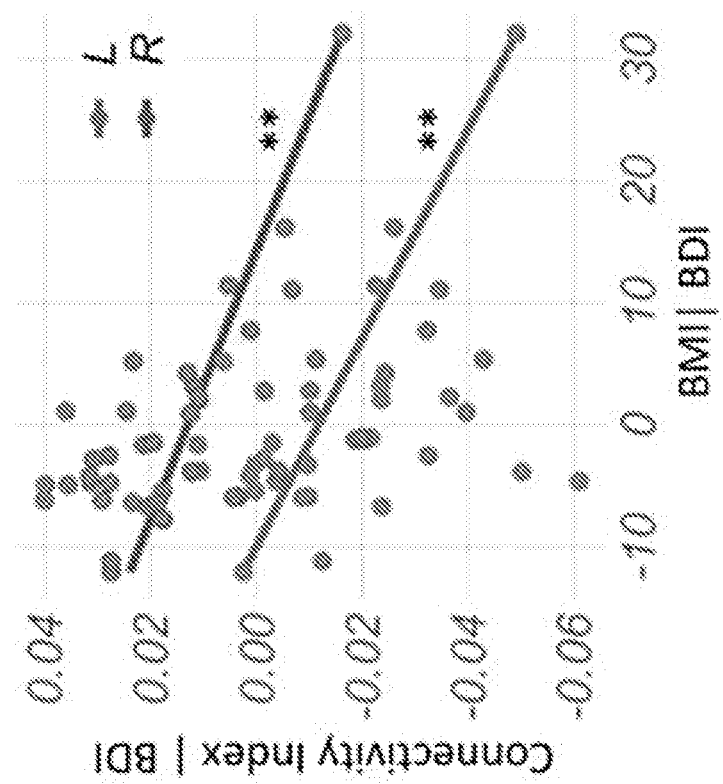

Depression scores (Beck Depression Inventory, BDI) were significantly increased in the obese compared to the lean and WNL cohorts (U=62, P=0.02) (FIG. 3A). Measures of binge frequency, anxiety and problems in emotion regulation did not differ between the lean and obese cohort (Table 2). Not surprisingly, categorical presence of depression (measured here by BDI≥10) was significantly different between cohorts ($\chi^2$=6.3; P=0.01); with a higher prevalence of depression in the obese than the lean cohort (FIG. 3B; Table 2). Nonetheless, correlations between BMI and left vmPFC-NAc tractography-CI (rho=−0.44., P=0.008, two-tailed) and right vmPFC-NAc tractography-CI (rho=−0.52, P=0.002, two-tailed) (FIG. 3C), as well as right vmPFC thickness (FIG. 3D) (rho=−0.42, P=0.01, two-tailed) remained significant after including depression as a covariate. BMI and left vmPFC thickness no longer marginally correlated after partialling out depression (rho=−0.27, P=0.11, two-tailed) (FIG. 3D).

Example 12. VmPFC-NAc Streamlines Converge within the NAc Shell Subregion

Figures 4A, 4B:
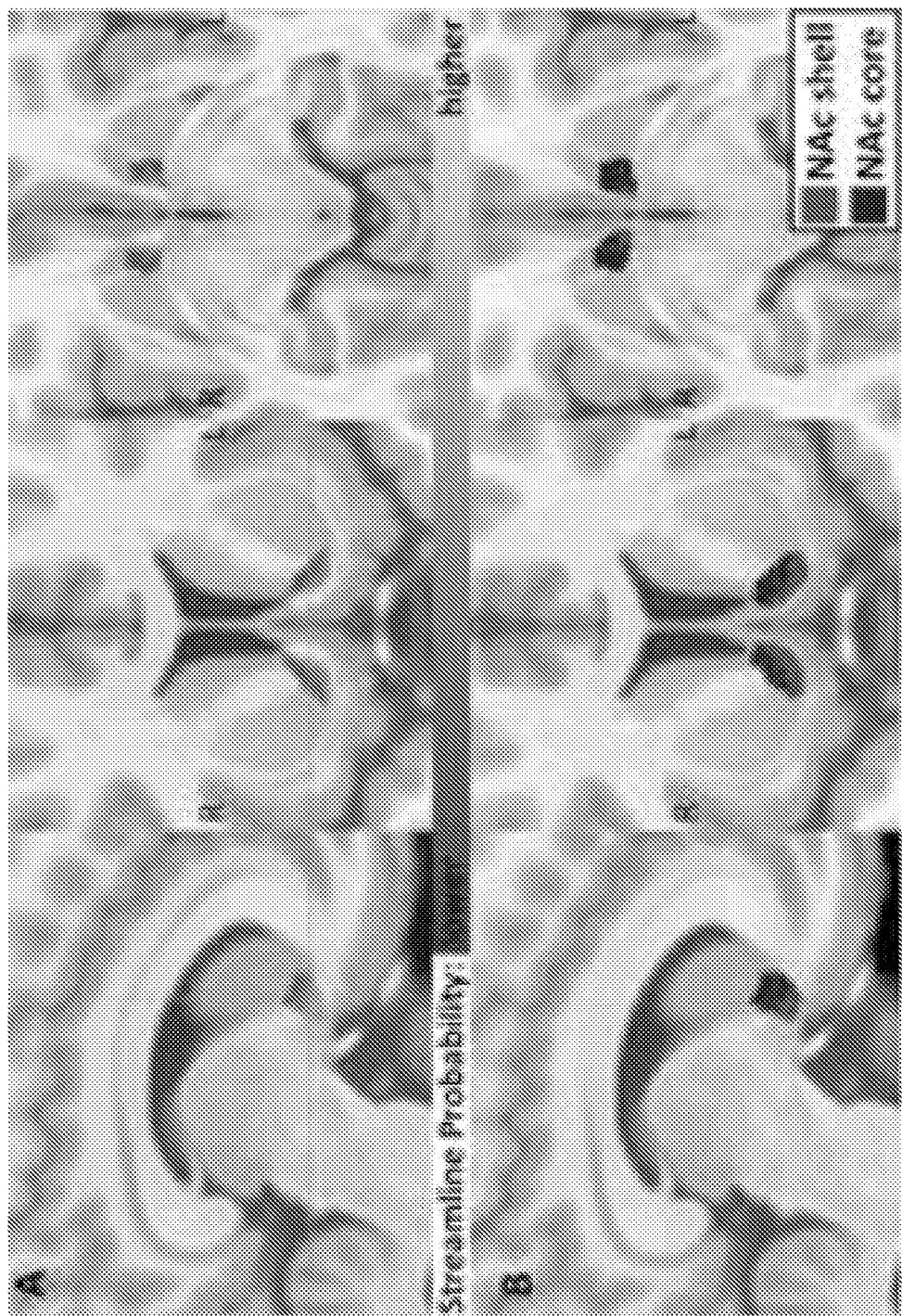
FIGS. 4A-4J show that depression scores do not explain vmPFC-NAc connectivity index and vmPFC thickness correlations with BMI among subjects with binge eating.
Figure 4C:
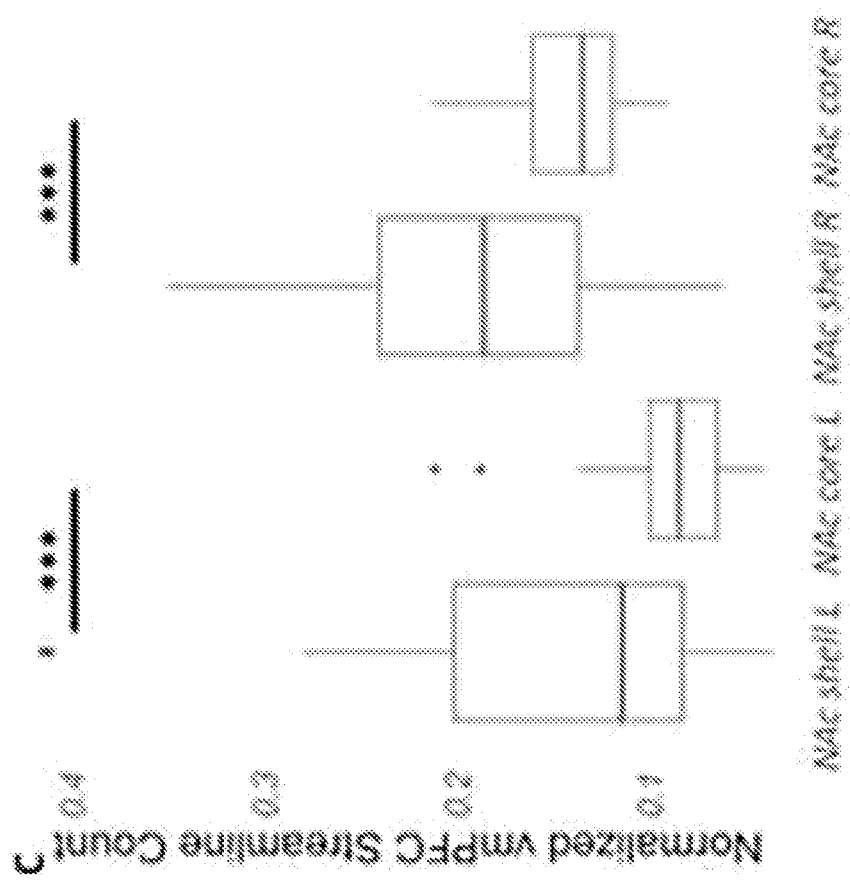

After identifying that vmPFC-NAc tractography-CI as well as vmPFC thickness are decreased in the obese cohort, probabilistic tractography was performed in a normative, high-resolution HCP 7T diffusion MRI dataset of 178 subjects to uncover the region within the NAc where the vmPFC streamline are more densely located, or the presumed NAc subregion where the vmPFC-NAc circuit can be targeted (FIG. 4A). In the normative HCP dataset, the k-means successfully identified two subregions in all 356 NAc (i.e., one per hemisphere for each subject in normative dataset) analyzed with distinct connectivity with the vmPFC (FIG. 4B). Most vmPFC streamlines converged in a ventromedial region within the NAc analogous to the previously described presumed NAc shell (defined herein as shell), while the other subregion analogous to the presumed NAc core (defined herein as core) received less vmPFC streamlines (Baliki et al., 2013; Cartmell et al., 2019). This analysis in normative HCP dataset was performed to define NAc subregions that were then applied to the binge-prone cohort. The shell subregion, as defined by probabilistic tractography in the high-resolution, normative HCP dataset, also presented higher normalized streamline counts to the left (U=363, P<0.001) and right (U=367, P<0.001) vmPFC than the NAc core in subjects with binge eating when used as seed regions in probabilistic tractography (FIG. 4C).

Figures 4D, 4E:
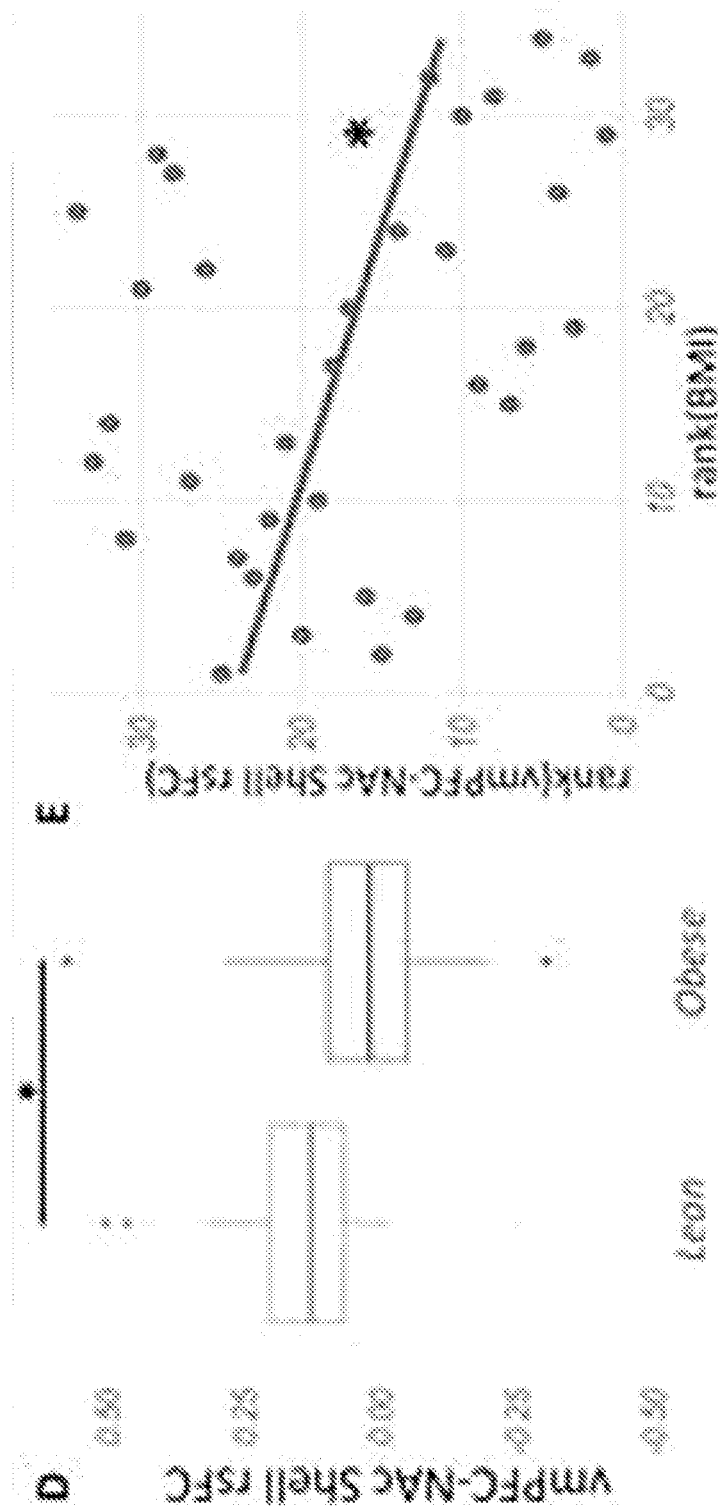

Example 13. Decreased vmPFC-NAc Shell Resting-State Functional Connectivity in Obese Cohort The hypothesis that this NAc target subregion (i.e., NAc shell) exhibited decreased rsFC with the vmPFC in the obese cohort was tested. Indeed, it was found that this vmPFC-NAc shell rsFC was significantly lower in the obese compared to lean cohort (U=149, P=0.04) (FIG. 4D). In line with this hypothesis, the vmPFC-NAc shell rsFC was also significantly correlated with BMI in the overall binge eating cohort (rho=−0.36, P=0.04) (FIG. 4E).

Figures 4F, 4G:
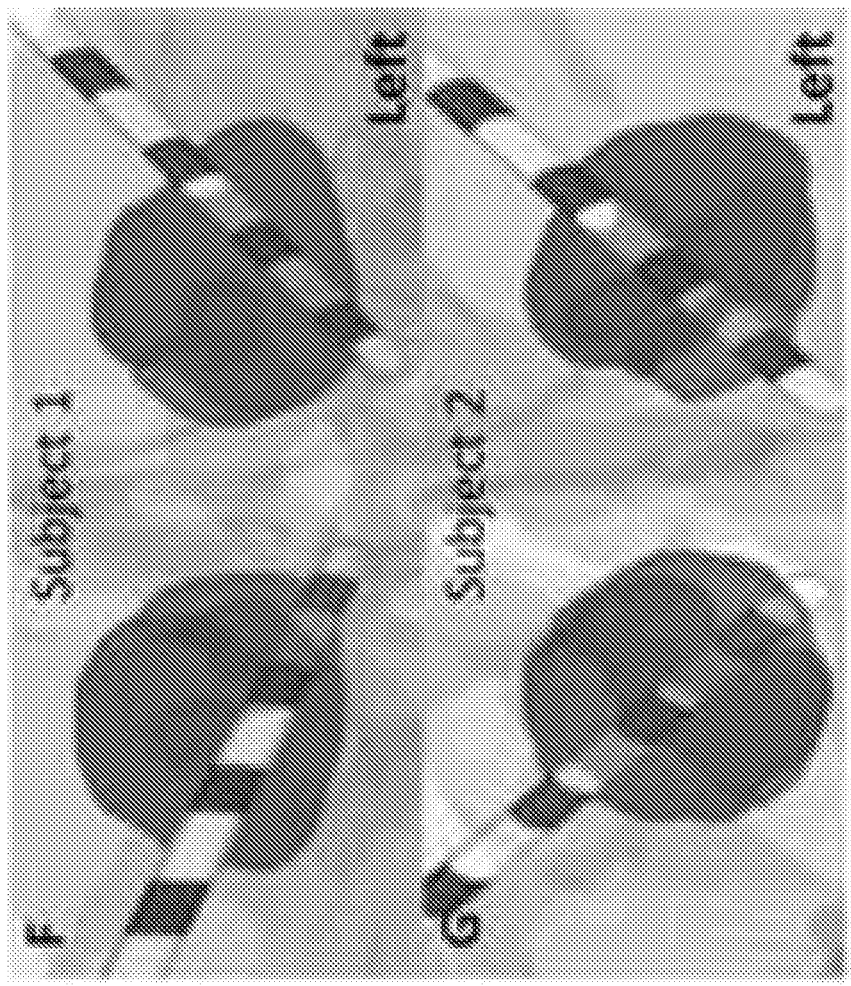
Figure 4H:
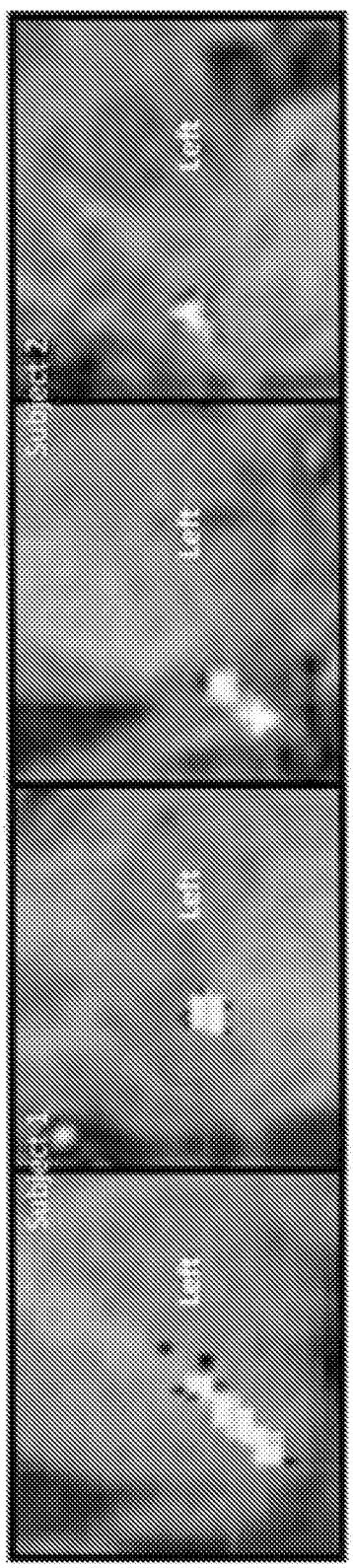
Figures 4I, 4J:
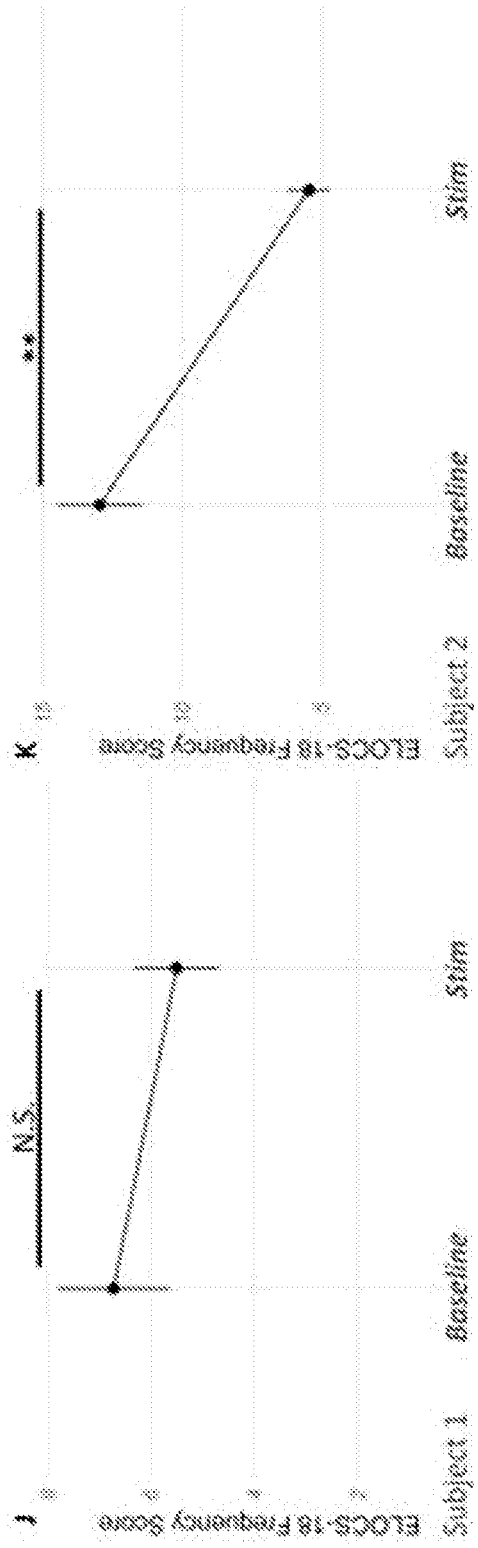

Example 14. Case Illustration-Directly Targeting the vmPFC-NAc Circuit in Clinical Settings To assess feasibility of applying probabilistic tractography in clinical settings to target this NAc subregion where vmPFC streamlines were more densely located (i.e., NAc shell), the preoperative diffusion MRI protocol (summarized in Table 1) was used. Two subjects with binge eating disorder meeting criteria for morbid obesity received the high-resolution diffusion MRI protocol before undergoing responsive DBS in a first-in-human clinical trial (ClinicalTrials.gov Identifier: NCT03868670) (Wu et al., 2020). To confirm location of electrode implant, intra- and post-operative CT scans was used, which allowed the reconstruction of the electrodes and overlay to the circuit-based target from the analysis using pre-operative MRI. A NAc subregion (shell) where vmPFC streamlines more robustly converged could be identified and targeted in both subjects (FIG. 4F). The two ventral-most contacts were successfully implanted in the NAc shell unilaterally (right) for subject 1 and bilaterally for subject 2 (FIG. 4G).

Example 15. Modulating the vmPFC-NAc Circuit Ameliorates Self-Control Over Food Choices Responsive DBS was initiated using the left lead only in both subjects. Therefore, the tractography-defined vmPFC-NAc circuit was clearly modulated in subject 2 but not subject 1 necessarily. Subject 1 was initiated in monopolar mode using the second ventral-most contact (3.0 mA; 80 μs; 125 Hz; charge density of 3.0 μC/cm2). Subject 2 was initiated in bipolar mode using the two ventral-most contacts (0.5 mA; 80 μs; 125 Hz; charge density of 0.5 μC/cm2). Stimulation was delivered in two 5-second bursts triggered by a continuous detector (Neurostimulator; model RNS-320; NeuroPace) programmed to identify a candidate biomarker of binge eating (data not included) in line with a previously described approach (Wu et al., 2018). Both subjects remained blinded to stimulation vs. sham-stimulation. After initial active stimulation, subject 1 had an 18% decrease in mean Eating Loss of Control Scale (ELOCS-18) frequency score compared to baseline (U=192, P=0.34), while subject 2 had a 59.4% decrease in mean ELOCS-18 frequency score compared to baseline (U=265, P=0.001). Subject 1 reported an effort to make better food choices after stimulation but did not acknowledge any difference compared to baseline. Conversely, subject 2 reported consistently feeling more in control of food choices within 24h of active stimulation initiation. Specifically, the latter subject reported the following: "I haven't had peanut butter in two days. I've just had no desire for it. Could be all in my head (pun intended), but just don't want it. Which is kind a scary because I would eat it 3-4 times a day before." She later reported only having three meals per day since programming, without the prior usual urges to snack between meals. Moreover, no noticeable changes in BDI or Positive and Negative Affect Schedule (PANAS) scores were observed for either subject following initiation of active stimulation.

While the disclosure has been particularly shown and described with reference to specific embodiments (some of which are preferred embodiments), it should be understood by those having skill in the art that various changes in form and detail may be made therein without departing from the spirit and scope of the present disclosure as disclosed herein.

REFERENCES

American Psychiatric Association (2013). Diagnostic and Statistical Manual of Mental Disorders (American Psychiatric Association).

Andersson, J. L. R., Skare, S., and Ashburner, J. (2003). How to correct susceptibility distortions in spin-echo echo-planar images: application to diffusion tensor imaging. NeuroImage 20, 870-888.

Avants, B., Tustison, N., and Song, G. (2009). Advanced Normalization Tools: V1.0. Insight J. 681.

Avants, B. B., Tustison, N. J., Song, G., Cook, P. A., Klein, A., and Gee, J. C. (2011a). A reproducible evaluation of ANTs similarity metric performance in brain image registration. NeuroImage 54, 2033-2044.

Avants, B. B., Tustison, N. J., Wu, J., Cook, P. A., and Gee, J. C. (2011b). An Open Source Multivariate Framework for n-Tissue Segmentation with Evaluation on Public Data. Neuroinformatics 9, 381-400.

Baliki, M. N., Mansour, A., Baria, A. T., Huang, L., Berger, S. E., Fields, H. L., and Apkarian, A. V. (2013). Parceling Human Accumbens into Putative Core and Shell Dissociates Encoding of Values for Reward and Pain. J. Neurosci. 33, 16383-16393.

Beck, A. T., Ward, C. H., Mendelson, M., Mock, J., and Erbaugh, J. (1961). An Inventory for Measuring Depression. Arch. Gen. Psychiatry 4, 561-571.

Beck, A. T., Epstein, N., Brown, G., and Steer, R. A. (1988). An inventory for measuring clinical anxiety: psychometric properties. J. Consult. Clin. Psychol. 56, 893-897.

Behrens, T. E. J., Berg, H. J., Jbabdi, S., Rushworth, M. F. S., and Woolrich, M. W. (2007). Probabilistic diffusion tractography with multiple fibre orientations: What can we gain? NeuroImage 34, 144-155.

Blomquist, K. K., Roberto, C. A., Barnes, R. D., White, M. A., Masheb, R. M., and Grilo, C. M. (2014). Development and Validation of the Eating Loss of Control Scale. Psychol. Assess. 26, 77-89.

Bossert, J. M., Stern, A. L., Theberge, F. R. M., Marchant, N. J., Wang, H.-L., Morales, M., and Shaham, Y. (2012). Role of Projections from Ventral Medial Prefrontal Cortex to Nucleus Accumbens Shell in Context-Induced Reinstatement of Heroin Seeking. J. Neurosci. 32, 4982-4991.

Cartmell, S. C., Tian, Q., Thio, B. J., Leuze, C., Ye, L., Williams, N. R., Yang, G., Ben-Dor, G., Deisseroth, K., Grill, W. M., et al. (2019). Multimodal characterization of the human nucleus accumbens. NeuroImage 198, 137-149.

Chao, A. M., Wadden, T. A., Faulconbridge, L. F., Sarwer, D. B., Webb, V. L., Shaw, J. A., Thomas, J. G., Hopkins, C. M., Bakizada, Z. M., Alamuddin, N., et al. (2016). Binge-eating disorder and the outcome of bariatric surgery in a prospective, observational study: Two-year results. Obesity 24, 2327-2333.

Cho, S., Hachmann, J. T., Balzekas, I., In, M.-H., Andres-Beck, L. G., Lee, K. H., Min, H.-K., and Jo, H. J. (2019). Resting-state functional connectivity modulates the BOLD activation induced by nucleus accumbens stimulation in the swine brain. Brain Behav. 9, e01431.

Ciric, R., Wolf, D. H., Power, J. D., Roalf, D. R., Baum, G. L., Ruparel, K., Shinohara, R. T., Elliott, M. A., Eickhoff, S. B., Davatzikos, C., et al. (2017). Benchmarking of participant-level confound regression strategies for the control of motion artifact in studies of functional connectivity. NeuroImage 154, 174-187.

Davis, S. W., Dennis, N. A., Buchler, N. G., White, L. E., Madden, D. J., and Cabeza, R. (2009). Assessing the effects of age on long white matter tracts using diffusion tensor tractography. NeuroImage 46, 530-541.

Donnelly, B., Touyz, S., Hay, P., Burton, A., Russell, J., and Caterson, I. (2018). Neuroimaging in bulimia nervosa and binge eating disorder: a systematic review. J. Eat. Disord. 6, 3.

Dunlop, B. W., Rajendra, J. K., Craighead, W. E., Kelley, M. E., McGrath, C. L., Choi, K. S., Kinkead, B., Nemeroff, C. B., and Mayberg, H. S. (2017). Functional Connectivity of the Subcallosal Cingulate Cortex And Differential Outcomes to Treatment With Cognitive-Behavioral Therapy or Antidepressant Medication for Major Depressive Disorder. Am. J. Psychiatry 174, 533-545.

Esteban, O., Markiewicz, C. J., Blair, R. W., Moodie, C. A., Isik, A. I., Erramuzpe, A., Kent, J. D., Goncalves, M., DuPre, E., Snyder, M., et al. (2019). fMRIPrep: a robust preprocessing pipeline for functional MRI. Nat. Methods 16, 111-116.

Fairburn, C. G., and Cooper, Z. (1993). The Eating Disorder Examination (12th edition). In Binge Eating: Nature, Assessment, and Treatment, (New York, NY, US: Guilford Press), pp. 317-360.

Geha, P., Cecchi, G., Todd Constable, R., Abdallah, C., and Small, D. M. (2017). Reorganization of brain connectivity in obesity. Hum. Brain Mapp. 38, 1403-1420.

Ghazizadeh, A., Ambroggi, F., Odean, N., and Fields, H. L. (2012). Prefrontal Cortex Mediates Extinction of Responding by Two Distinct Neural Mechanisms in Accumbens Shell. J. Neurosci. 32, 726-737.

Glasser, M. F., Sotiropoulos, S. N., Wilson, J. A., Coalson, T. S., Fischl, B., Andersson, J. L., Xu, J., Jbabdi, S., Webster, M., Polimeni, J. R., et al. (2013). The minimal preprocessing pipelines for the Human Connectome Project. NeuroImage 80, 105-124.

Gratz, K. L., and Roemer, L. (2004). Multidimensional Assessment of Emotion Regulation and Dysregulation: Development, Factor Structure, and Initial Validation of the Difficulties in Emotion Regulation Scale. J. Psychopathol. Behav. Assess. 26, 41-54.

Grucza, R. A., Przybeck, T. R., and Cloninger, C. R. (2007). Prevalence and Correlates of Binge Eating Disorder in a Community Sample. Compr. Psychiatry 48, 124-131.

Haber, S. N., Kim, K.-S., Mailly, P., and Calzavara, R. (2006). Reward-Related Cortical Inputs Define a Large Striatal Region in Primates That Interface with Associative Cortical Connections, Providing a Substrate for Incentive-Based Learning. J. Neurosci. 26, 8368-8376.

Halpern, C. H., Tekriwal, A., Santollo, J., Keating, J. G., Wolf, J. A., Daniels, D., and Bale, T. L. (2013). Amelioration of binge eating by nucleus accumbens shell deep brain stimulation in mice involves D2 receptor modulation. J. Neurosci. Off. J. Soc. Neurosci. 33, 7122-7129.

He, X., Stefan, M., Terranova, K., Steinglass, J., and Marsh, R. (2016). Altered White Matter Microstructure in Adolescents and Adults with Bulimia Nervosa. Neuropsychopharmacol. Off. Publ. Am. Coll. Neuropsychopharmacol. 41, 1841-1848.

Ho, A. L., Sussman, E. S., Zhang, M., Pendharkar, A. V., Azagury, D. E., Bohon, C., and Halpern, C. H. (2015). Deep Brain Stimulation for Obesity. Cureus 7, e259.

Honey, C. J., Sporns, O., Cammoun, L., Gigandet, X., Thiran, J. P., Meuli, R., and Hagmann, P. (2009). Predicting human resting-state functional connectivity from structural connectivity. Proc. Natl. Acad. Sci. 106, 2035-2040.

Jenkinson, M., Beckmann, C. F., Behrens, T. E. J., Woolrich, M. W., and Smith, S. M. (2012). FSL. NeuroImage 62, 782-790.

Kakusa, B., Saluja, S., Tate, W. J., Espil, F. M., Halpern, C. H., and Williams, N. R. (2019). Robust clinical benefit of multi-target deep brain stimulation for treatment of Gilles de la Tourette syndrome and its comorbidities. Brain Stimulat. 12, 816-818.

Kakusa, B., Saluja, S., Barbosa, D. A. N., Cartmell, S., Espil, F. M., Williams, N. R., McNab, J. A., and Halpern, C. H. (2021). Evidence for the role of the dorsal ventral lateral posterior thalamic nucleus connectivity in deep brain stimulation for Gilles de la Tourette syndrome. J. Psychiatr. Res. 132, 60-64.

Kessler, R. C., Berglund, P. A., Chiu, W. T., Deitz, A. C., Hudson, J. I., Shahly, V., Aguilar-Gaxiola, S., Alonso, J., Angermeyer, M. C., Benjet, C., et al. (2013). The prevalence and correlates of binge eating disorder in the WHO World Mental Health Surveys. Biol. Psychiatry 73, 904-914.

Lavagnino, L., Arnone, D., Cao, B., Soares, J. C., and Selvaraj, S. (2016a). Inhibitory control in obesity and binge eating disorder: A systematic review and meta-analysis of neurocognitive and neuroimaging studies. Neurosci. Biobehav. Rev. 68, 714-726.

Lavagnino, L., Mwangi, B., Bauer, I. E., Cao, B., Selvaraj, S., Prossin, A., and Soares, J. C. (2016b). Reduced Inhibitory Control Mediates the Relationship Between Cortical Thickness in the Right Superior Frontal Gyrus and Body Mass Index. Neuropsychopharmacology 41, 2275-2282.

Mantione, M., van de Brink, W., Schuurman, P. R., and Denys, D. (2010). Smoking Cessation and Weight Loss After Chronic Deep Brain Stimulation of the Nucleus Accumbens: Therapeutic and Research Implications: Case Report. Neurosurgery 66.

Marsh, R., Stefan, M., Bansal, R., Hao, X., Walsh, B. T., and Peterson, B. S. (2015). Anatomical Characteristics of the Cerebral Surface in Bulimia Nervosa. Biol. Psychiatry 77, 616-623.

McCuen-Wurst, C., Ruggieri, M., and Allison, K. C. (2018). Disordered eating and obesity: associations between binge eating-disorder, night-eating syndrome, and weight-related comorbidities. Ann. N. Y. Acad. Sci. 1411, 96-105.

Medic, N., Ziauddeen, H., Ersche, K. D., Farooqi, I. S., Bullmore, E. T., Nathan, P. J., Ronan, L., and Fletcher, P. C. (2016). Increased body mass index is associated with specific regional alterations in brain structure. Int. J. Obes. 2005 40, 1177-1182.

Nauczyciel, C., Robic, S., Dondaine, T., Verin, M., Robert, G., Drapier, D., Naudet, F., and Millet, B. (2013). The nucleus accumbens: a target for deep brain stimulation in resistant major depressive disorder. J. Mol. Psychiatry 1, 17.

Parkes, L., Fulcher, B., Yücel, M., and Fornito, A. (2018). An evaluation of the efficacy, reliability, and sensitivity of motion correction strategies for resting-state functional MRI. NeuroImage 171, 415-436.

Pauli, W. M., Nili, A. N., and Tyszka, J. M. (2018). A high-resolution probabilistic in vivo atlas of human subcortical brain nuclei. Sci. Data 5, 180063.

Pierce, R. C., and Vassoler, F. M. (2013). Deep brain stimulation for the treatment of addiction: basic and clinical studies and potential mechanisms of action. Psychopharmacology (Berl.) 229, 487-491.

Power, J. D., Barnes, K. A., Snyder, A. Z., Schlaggar, B. L., and Petersen, S. E. (2012). Spurious but systematic correlations in functional connectivity MRI networks arise from subject motion. NeuroImage 59, 2142-2154.

Power, J. D., Mitra, A., Laumann, T. O., Snyder, A. Z., Schlaggar, B. L., and Petersen, S. E. (2014). Methods to detect, characterize, and remove motion artifact in resting state fMRI. NeuroImage 84, 320-341.

Pruim, R. H. R., Mennes, M., van Rooij, D., Llera, A., Buitelaar, J. K., and Beckmann, C. F. (2015). ICA-AROMA: A robust ICA-based strategy for removing motion artifacts from fMRI data. NeuroImage 112, 267-277.

Rapuano, K. M., Laurent, J. S., Hagler, D. J., Hatton, S. N., Thompson, W. K., Jernigan, T. L., Dale, A. M., Casey, B. J., and Watts, R. (2020). Nucleus accumbens cytoarchitecture predicts weight gain in children. Proc. Natl. Acad. Sci. 117, 26977-26984.

Richard, J. M., and Berridge, Kent. C. (2013). Prefrontal cortex modulates desire and dread generated by nucleus accumbens glutamate disruption. Biol. Psychiatry 73, 360-370.

Riva-Posse, P., Choi, K. S., Holtzheimer, P. E., Crowell, A. L., Garlow, S. J., Rajendra, J. K., McIntyre, C. C., Gross, R. E., and Mayberg, H. S. (2018). A connectomic approach for subcallosal cingulate deep brain stimulation surgery: prospective targeting in treatment-resistant depression. Mol. Psychiatry 23, 843-849.

Royston, P. (1992). Approximating the Shapiro-Wilk W-test for non-normality. Stat. Comput. 2, 117-119.

Salat, D. H., Buckner, R. L., Snyder, A. Z., Greve, D. N., Desikan, R. S. R., Busa, E., Morris, J. C., Dale, A. M., and Fischl, B. (2004). Thinning of the Cerebral Cortex in Aging. Cereb. Cortex 14, 721-730.

Smith, S. M., Jenkinson, M., Woolrich, M. W., Beckmann, C. F., Behrens, T. E. J., Johansen-Berg, H., Bannister, P. R., De Luca, M., Drobnjak, I., Flitney, D. E., et al. (2004). Advances in functional and structural MR image analysis and implementation as FSL. NeuroImage 23 *Suppl* 1, S208-219.

Sotiropoulos, S. N., Jbabdi, S., Xu, J., Andersson, J. L., Moeller, S., Auerbach, E. J., Glasser, M. F., Hernandez, M., Sapiro, G., Jenkinson, M., et al. (2013). Advances in diffusion MRI acquisition and processing in the Human Connectome Project. NeuroImage 80, 125-143.

Stice, E., Figlewicz, D. P., Gosnell, B. A., Levine, A. S., and Pratt, W. E. (2013). The contribution of brain reward circuits to the obesity epidemic. Neurosci. Biobehav. Rev. 37, 2047-2058.

Tronnier, V. M., Rasche, D., Thorns, V., Alvarez-Fischer, D., Munte, T. F., and Zurowski, B. (2018). Massive weight loss following deep brain stimulation of the nucleus accumbens in a depressed woman. Neurocase 24, 49-53.

Tschentscher, N., Ruisinger, A., Blank, H., Diaz, B., and Kriegstein, K. von (2019). Reduced Structural Connectivity Between Left Auditory Thalamus and the Motion-Sensitive Planum Temporale in Developmental Dyslexia. J. Neurosci. 39, 1720-1732.

Tustison, N. J., Avants, B. B., Cook, P. A., Zheng, Y., Egan, A., Yushkevich, P. A., and Gee, J. C. (2010). N4ITK: Improved N3 Bias Correction. IEEE Trans. Med. Imaging 29, 1310-1320.

Van Essen, D. C., Ugurbil, K., Auerbach, E., Barch, D., Behrens, T. E. J., Bucholz, R., Chang, A., Chen, L., Corbetta, M., Curtiss, S. W., et al. (2012). The Human Connectome Project: a data acquisition perspective. NeuroImage 62, 2222-2231.

Vassoler, F. M., White, S. L., Hopkins, T. J., Guercio, L. A., Espallergues, J., Berton, O., Schmidt, H. D., and Pierce, R. C. (2013). Deep Brain Stimulation of the Nucleus Accumbens Shell Attenuates Cocaine Reinstatement through Local and Antidromic Activation. J. Neurosci. 33, 14446-14454.

Volkow, N. D., Wang, G.-J., Telang, F., Fowler, J. S., Goldstein, R. Z., Alia-Klein, N., Logan, J., Wong, C., Thanos, P. K., Ma, Y., et al. (2009). Inverse Association Between BMI and Prefrontal Metabolic Activity in Healthy Adults. Obes. Silver Spring Md 17, 60-65.

Watson, D., Clark, L. A., and Tellegen, A. (1988). Development and validation of brief measures of positive and negative affect: the PANAS scales. J. Pers. Soc. Psychol. 54, 1063-1070.

White, M. A., Kalarchian, M. A., Masheb, R. M., Marcus, M. D., and Grilo, C. M. (2010). Loss of control over eating predicts outcomes in bariatric surgery patients: a prospective, 24-month follow-up study. J. Clin. Psychiatry 71, 175-184.

Winecoff, A., Clithero, J. A., Carter, R. M., Bergman, S. R., Wang, L., and Huettel, S. A. (2013). Ventromedial Prefrontal Cortex Encodes Emotional Value. J. Neurosci. 33, 11032-11039.

Wu, H., Miller, K. J., Blumenfeld, Z., Williams, N. R., Ravikumar, V. K., Lee, K. E., Kakusa, B., Sacchet, M. D., Wintermark, M., Christoffel, D. J., et al. (2018). Closing the loop on impulsivity via nucleus accumbens delta-band activity in mice and man. Proc. Natl. Acad. Sci. 115, 192-197.

Wu, H., Adler, S., Azagury, D. E., Bohon, C., Safer, D. L., Barbosa, D. A. N., Bhati, M. T., Williams, N. R., Dunn, L. B., Tass, P. A., et al. (2020). Brain-Responsive Neurostimulation for Loss of Control Eating: Early Feasibility Study. Neurosurgery.

Yan, C.-G., Wang, X.-D., Zuo, X.-N., and Zang, Y.-F. (2016). DPABI: Data Processing & Analysis for (Resting-State) Brain Imaging. Neuroinformatics 14, 339-351.

We claim:

1. A method of targeting a neural circuit of a subject having an impulsivity-related or uncontrollable behavior, the method comprising
    (a) generating a circuit-specific brain connectivity profile using a directionality map of water diffusivity based on MRI of the subject, wherein the directionality map comprises voxel-wise diffusion data resolved for direction-specific water diffusivity;
    (b) generating a circuit-specific voxel-wise connectivity matrix from the circuit-specific brain connectivity profile, wherein the circuit-specific voxel-wise connectivity matrix encodes quantitative connectivity strengths for each voxel within the neural circuit to be targeted;
    (c) using a connectivity-based segmentation algorithm to segment the circuit-specific voxel-wise connectivity matrix to generate a three-dimensional sub-region that identifies a behaviorally defined portion of the neural circuit associated with the impulsivity-related or uncontrolled behavior, wherein the segmentation is driven by connectivity strength patterns correlated with the behavioral phenotype; and
    (d) targeting the identified three-dimensional sub-region of the neural circuit with a neuromodulation therapy.

2. The method of claim 1, wherein the subject is treated with the neuromodulation therapy by targeting the identified neural circuit.

3. The method of claim 1, wherein the subject is treated with a personalized neuromodulation therapy for the subject, wherein the neuromodulation therapy is personalized based on the subject-specific voxel-wise brain connectivity, neuroimaging-derived sub-regional segmentation, cortical thickness, clinical and behavioral complains, previous responses to neuromodulation, and other available clinical and behavioral covariates of the subject.

4. The method of claim 1, wherein the MRI is a diffusion, structural, and/or functional resting-state MRI.

5. The method of claim 1, wherein the connectivity-based segmentation algorithm is selected from the group consisting of k-means clustering algorithm, independent component analysis, principal component analysis, stochastic relaxation with a decoder perturbation, random search among centroids, and hierarchical clustering algorithms, wherein the connectivity-based segmentation algorithm is applied to the circuit-specific voxel-wise connectivity matrix to identify a behaviorally defined sub-region.

6. The method of claim 1, wherein the region of interest is selected from the group consisting of nucleus accumbens (NAc), anterior limb of the internal capsule (ALIC), subthalamic nucleus (STN), subthalamic nucleus (STN), thalamus, ventromedial prefrontal cortex (vmPFC), anterior cingulate cortex (ACC), orbitofrontal (OFC)/frontopolar cortex (FP), and dorsomedial/dorsolateral prefrontal cortex.

7. The method of claim 6, wherein the region of interest is nucleus accumbens (NAc).

8. The method of claim 1, wherein the identified neural circuit is selected from the group consisting of ventromedial prefrontal cortex (vmPFC)-NAc circuit, orbitofrontal/frontopolar cortex-ALIC circuit, orbitofrontal/frontopolar cortex-thalamus circuit, vmPFC-NAc circuit, ACC-NAC circuit, dorsal prefrontal cortex-vmPFC-NAc circuit.

9. The method of claim 8, wherein the identified neural circuit is vmPFC-NAc circuit.

10. The method of claim 1, wherein the neuromodulation therapy is invasive or non-invasive.

11. The method of claim 10, wherein the neuromodulation therapy selected from the group consisting of deep brain stimulation, focused ultrasound, transcranial magnetic stimulation, transcranial electrical stimulation, radiomodulation, and neuroablation.

12. The method of claim 1, wherein the impulsivity-related or uncontrollable behavior is selected from the group consisting of (1) a pathologic impulsivity-related behavior marked by loss of control; (2) a pathological impulsivity or compulsive behavior related to uncontrollable repetitive thoughts; (3) an uncontrollable compulsive behavior related to obsessive thoughts; (4) a pathologic behavior marked by uncontrollable tics, urges and compulsions; (5) a pathologic impulsivity-related behavior marked by loss of control; (6) a pathologic impulsivity and uncontrollable behavior marked by issues with cognitive control and cognitive flexibility; (7) a pathologic impulsivity, loss of control and compulsive behaviors related to obsessive thoughts and urges; and (8) a pathologic behavior marked by loss of control and/or impaired of motivation.

13. The method of claim 1, wherein the impulsivity-related or uncontrollable behavior is selected from the group consisting of loss of control eating, binge-eating, purging, craving, binge-drinking, self-harm, aggressiveness, substance abuse, compulsive cleaning/washing, compulsive checking, compulsive gambling, trichotillomania, and skin-picking.

\* \* \* \* \*